(12) United States Patent
Miyashita et al.

(10) Patent No.: US 6,328,886 B1
(45) Date of Patent: Dec. 11, 2001

(54) GAS DIFFUSER FOR AERATION VESSEL OF MEMBRANE ASSEMBLY

(75) Inventors: Satoshi Miyashita; Kenji Honjyo; Osami Kato; Kenji Watari; Takamitsu Takashima, all of Nagoya; Masanori Itakura, Otake; Hiroyuki Okazaki, Nagoya; Ikuo Kinoshita, Nagoya; Noriko Inoue, Nagoya, all of (JP)

(73) Assignees: Mitsubishi Rayon Co., Ltd., Tokyo; Mitsubishi Rayon Engineering Co., Ltd., Nagoya, both of (JP)

( * ) Notice: Subject to any disclaimer, the term of this patent is extended or adjusted under 35 U.S.C. 154(b) by 0 days.

(21) Appl. No.: 09/612,234

(22) Filed: Jul. 7, 2000

Related U.S. Application Data

(62) Division of application No. 09/372,179, filed on Aug. 11, 1999, now Pat. No. 6,280,626.

(30) Foreign Application Priority Data

| Aug. 12, 1998 | (JP) | 10-228394 |
|---|---|---|
| Aug. 13, 1998 | (JP) | 10-228921 |
| Sep. 10, 1998 | (JP) | 10-257209 |
| Sep. 10, 1998 | (JP) | 10-257210 |
| Sep. 30, 1998 | (JP) | 10-277913 |
| Oct. 8, 1998 | (JP) | 10-287068 |
| Oct. 20, 1998 | (JP) | 10-298838 |

(51) Int. Cl.[7] .................................................. B01D 65/02
(52) U.S. Cl. ................ 210/220; 210/221.2; 210/321.69; 261/20; 261/124
(58) Field of Search ............................ 261/19, 20, 23.1, 261/122.1, 124, 119.1, 121.1; 210/220, 221.2, 274, 279, 321.69, 636; 138/111

(56) References Cited

U.S. PATENT DOCUMENTS

| 129,397 | * 7/1872 | Cornell . | |
|---|---|---|---|
| 1,114,763 | * 10/1914 | Hodkinson . | |
| 2,417,519 | 3/1947 | Persson et al. . | |
| 3,837,629 | 9/1974 | Matras et al. . | |
| 4,563,277 | * 1/1986 | Tharp | 210/220 |
| 5,192,456 | 3/1993 | Ishida et al. . | |
| 5,534,202 | * 7/1996 | Roberts et al. | 261/122.1 |
| 5,639,373 | 6/1997 | Manhendran et al. . | |
| 5,783,083 | * 7/1998 | Henshaw et al. | 210/636 |
| 5,910,250 | 6/1999 | Mahendran et al. . | |
| 5,944,997 | 8/1999 | Pedersen et al. . | |
| 6,042,677 | 3/2000 | Mahendran et al. . | |

FOREIGN PATENT DOCUMENTS

| 0 510 328 B1 | 10/1995 | (EP) . |
|---|---|---|
| 0 931 582 A1 | 7/1999 | (EP) . |
| 2- 292 746 A | 3/1996 | (GB) . |
| 51-126982 | 11/1976 | (JP) . |
| 56-51207 | 5/1981 | (JP) . |
| 57-75191 | 5/1982 | (JP) . |
| 63-150394 | 6/1988 | (JP) . |
| 4-298292 | 10/1992 | (JP) . |

(List continued on next page.)

Primary Examiner—Joseph W. Drodge
(74) Attorney, Agent, or Firm—Fitch, Even, Tabin & Flannery

(57) ABSTRACT

The invention concerns a gas diffuser constructed and arranged to disperse gas into a aeration vessel of a water treatment assembly from a blower. The gas diffuser includes main pipes, branch pipes extending between the main pipes and containing gas discharge ports, wherein the branch pipes have a smaller cross-sectional area than the cross-sectional area of the main pipes. The gas discharge ports are further sized, constructed and arranged to reduce the possibility or likelihood of sludge from blocking the ports or entering the branch pipes. This object is achieved either by placement of the ports on the bottom sides of the branch pipes or, alternatively, by construction of the ports to include conduit members, themselves having an arrangement of openings or coverings to prevent or reduce the likelihood of sludge from blocking the ports or entering the branch pipes.

3 Claims, 36 Drawing Sheets

FOREIGN PATENT DOCUMENTS

| | | |
|---|---|---|
| 7-16590 | 1/1995 | (JP) . |
| 7-178321 | 7/1995 | (JP) . |
| 7-275887 | 10/1995 | (JP) . |
| 7-289859 | 11/1995 | (JP) . |
| 7-331295 | 12/1995 | (JP) . |
| 8-131784 | 5/1996 | (JP) . |
| 8-252599 | 10/1996 | (JP) . |
| 8-257378 | 10/1996 | (JP) . |
| 8-290045 | 11/1996 | (JP) . |
| 9-136093 | 5/1997 | (JP) . |
| 9-215980 | 8/1997 | (JP) . |
| 9-253462 | 9/1997 | (JP) . |
| 10-85565 | 4/1998 | (JP) . |
| 10-165782 | 6/1998 | (JP) . |
| 11-244674 | 9/1999 | (JP) . |
| WO 98/07506 | 2/1998 | (WO) . |

* cited by examiner

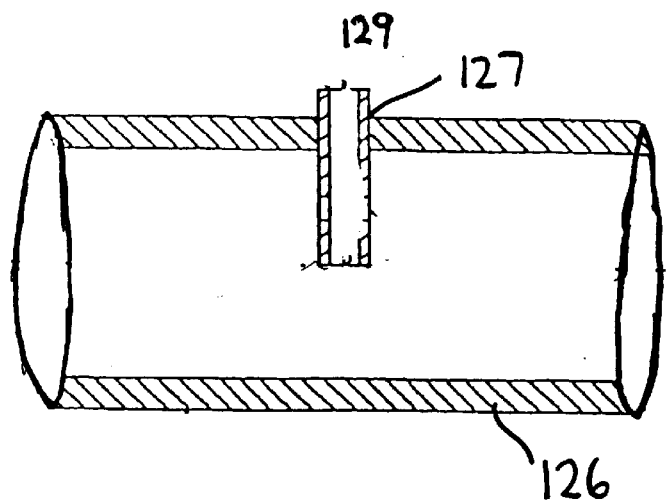
FIG. 45
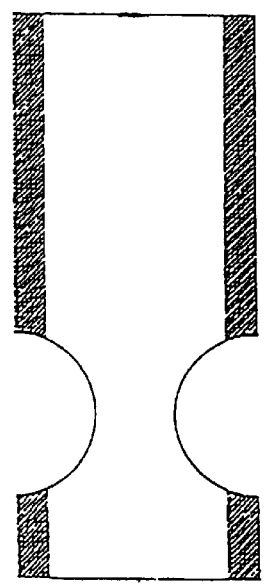
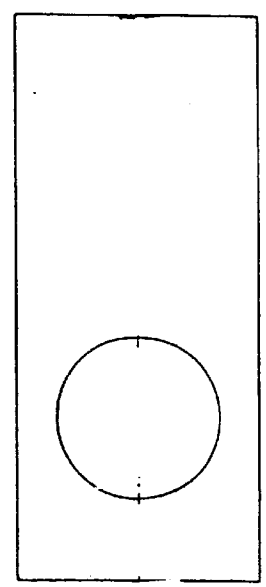
FIG. 46A  FIG. 46B

GAS DIFFUSER FOR AERATION VESSEL OF MEMBRANE ASSEMBLY

This is a division of application Ser. No. 09/372,179, filed Aug. 11, 1999, now Pat. No. 6,280,626.

BACKGROUND OF THE INVENTION

1. Field of the Invention

This invention relates to a novel construction for a membrane assembly suitable for solid-liquid separation, especially solid-liquid separation techniques designed to obtain purified water.

2. Description of the Related Art

Sand filtration and gravity precipitation techniques are known for performing solid-liquid separation in water purification treatments, treatments of sewage and waste water, and treatments of industrial waste water. However, the solid-liquid separation of such to-be-treated water (also referred to herein as object water) based on these conventional techniques often produces treated water of insufficient quality. To raise the quality to an acceptable level, vast and complex sites are needed to carry out the solid-liquid separation with these conventional techniques.

In recent years, the use of membrane modules containing separating membranes, such as precision filtration membranes or ultra-filtration membranes, have been proposed as alternative methods for solid-liquid separation of object water. When object water is subjected to filtration treatment with separation membranes, high quality treated water can be obtained, thus overcoming the drawbacks of the conventional sand filtration and gravity precipitation techniques.

However, prolonged use of separating membranes for solid-liquid separation of object water can cause suspended solids to clog the membranes, thereby decreasing he filtration flow rate and/or increasing the differential pressure between membranes. In order to restore a normal solid-liquid separation condition, the suspended solids are removed from the surfaces of the membranes by vibrating the separating membranes with diffusing air supplied from air diffusion pipes provided below the membrane modules. Vibration of the separating membranes only provides a temporary solution, however, since suspended solids tend to clog even diffusion-vibrated membranes, especially after long periods of use. Thus, it is necessary to conduct frequent maintenance work to maintain a normal filtration flow rate.

Japanese Patent Laid-Open No. 257378/1996 proposes a method in which a substantially parallel gas-liquid mixed flow is created in a membrane module unit by providing enclosure walls in direct contact with outermost membrane modules. However, although a parallel flow is created by this arrangement, the present inventors have found that this arrangement results in a low membrane scrubbing efficiency.

A system for moving air diffusion members has been proposed by Japanese Patent Laid-Open No. 24596/1996. In this system, movement of the diffusion members creates a turbulent flow of bubbles. This turbulent flow increases the efficiency of the system, but at the same time increases the power requirements for the system due to the need to move the diffusion members. Moreover, the movable members are prone to breakage, thereby increasing maintenance work frequency and cost.

SUMMARY OF THE INVENTION

It is therefore an object of this invention to overcome the above-discussed drawbacks by providing a solid-liquid separating membrane assembly which operates in such a manner that the clogging of membrane surfaces with suspended matter is rarely encountered, even when filtration of the object liquid is carried out over a prolonged and continuous period of time.

In accordance with the principles of this invention, the above and other objects are attained by the provision of a liquid-solid separating membrane assembly for separating solids from water. The membrane separator assembly comprises at least one membrane module unit (or subassembly) comprising a plurality of membrane modules, a gas diffuser disposed below the membrane modules, and an enclosure subassembly comprising opposing enclosure wall structures. The gas diffuser is constructed and arranged to diffuse a gas therefrom and clean the surfaces of vertically oriented separating membranes of the membrane modules with a gas-liquid mixed flow generated by the diffused gas. The enclosure wall structures are constructed and arranged to guide the gas diffused by the gas diffuser to the surfaces of the separating membranes, yet permit the liquid to flow through the enclosure subassembly.

At least some of the membrane modules each respectively comprise at least two membrane fixing members and one or more of the vertically oriented separating membranes extending between the membrane fixing members. At least one of the membrane fixing members has a main passageway formed therethrough. The main passageway is in fluid communication with one or more membrane passageways. According to one embodiment, the membrane passageway is defined by opposing spaced separating membrane sheets. According to an alternative embodiment, the membrane comprises one or more yarn-like members comprising hollow fibers, such as polyolefin fibers, which each individually define a membrane passageway. The membrane passageways are characterized by being accessible to water via permeation through the separating membranes and being inaccessible to solids which are impermeable relative to the separating membranes.

At least two of the enclosure wall structures are arranged parallel to the membrane modules positioned therebetween and are respectively spaced by a clearance from separating membranes of outermost ones of the membrane modules.

Another object of this invention is to operate the above-discussed membrane separator assembly as a filtration system in such a manner that operation of the filtration system effectively maintains the membranes of the assembly substantially sludge free so that maintenance requirements are significantly reduced compared to conventional assemblies. In preferred embodiments of the invention, gas discharged from a gas diffuser of the assembly is discharged at a rate of from about 10 to about 150 Nm$^3$/m$^2$ per horizontal cross-sectional area of the membrane assembly, at average vertical and horizontal flow velocities of from 0.01 m/sec to 1.5 m/sec.

Another object of this invention is the provision of a detergent for a membrane assembly, especially the above-discussed liquid-solid separating membrane assembly of this invention. In a preferred embodiment, the detergent contains percarbonate, such as sodium percarbonate, and optionally a bivalent iron salt and one or more additives selected from the group consisting of an oxidizer other than hypochlorite and hydrogen peroxide, a surfactant, a chelating agent, and a pH regulator.

Other objects, aspects and advantages of the invention will be apparent to those skilled in the art upon reading the specification and appended claims which, when read in conjunction with the accompanying drawings, explain the principles of this invention.

BRIEF DESCRIPTION OF THE DRAWINGS

The accompanying drawings serve to elucidate the principles of this invention by illustrated of preferred embodiments of the invention. In such drawings:

FIG. 45 is a sectional view of a branch pipe and port of a gas diffuser suitable for use with the present invention;

FIGS. 46A, 46B, 47A, 47B, 48A, and 48B are schematics of a hollow tubular member suitable for use with the gas diffuser of FIG. 45;

DETAILED DESCRIPTION OF THE INVENTION

Figure 1:
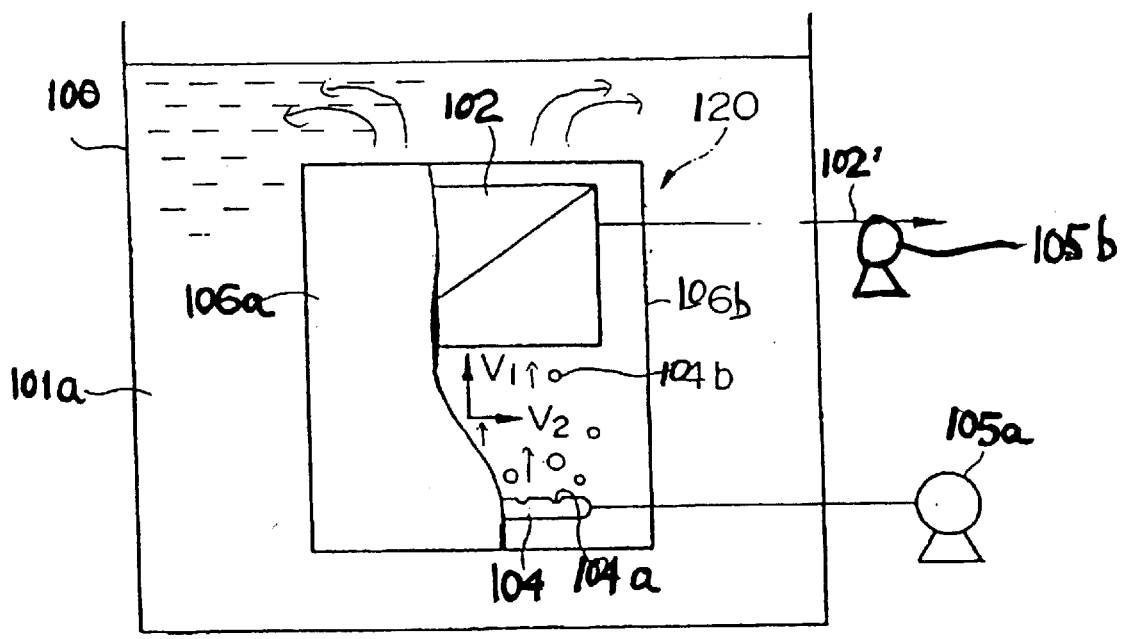
FIG. 1 is a partial sectional view of a liquid-solid separating membrane assembly installed in a treatment vessel in accordance with a first embodiment of this invention.

A liquid-solid separating membrane assembly 120 according to an embodiment of the present invention is shown in FIG. 1 installed in a treatment vessel 100. As will be explained in further detail below, the assembly 120 is designed to clean to-be-treated liquid (also referred to herein as object liquid) 101a by subjecting the object liquid 101a to solid-liquid separation using separating membranes. For example, in accordance with one application of this invention, the object liquid 101a is biologically treated as it is aerated in the treatment vessel 100 to thereby provide cleaned water, which is removed from the treatment vessel 100 via recovery flow passage 102'.

Figure 2A:
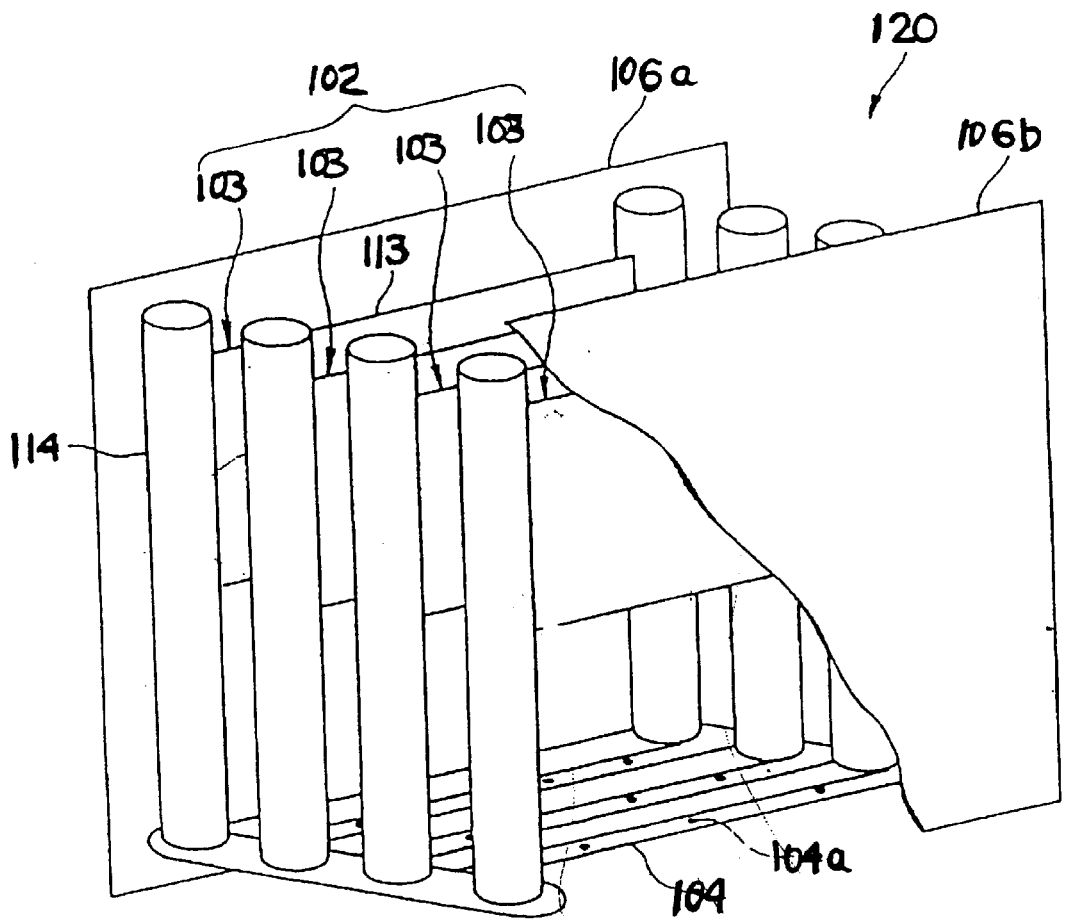
FIGS. 2A and 2B respectively are a perspective, partially sectional view and a side view of the assembly of FIG. 1, depicting opposing enclosure wall structures, a diffuser, and a membrane module unit comprising a plurality of membrane modules of the assembly.
Figure 2B:
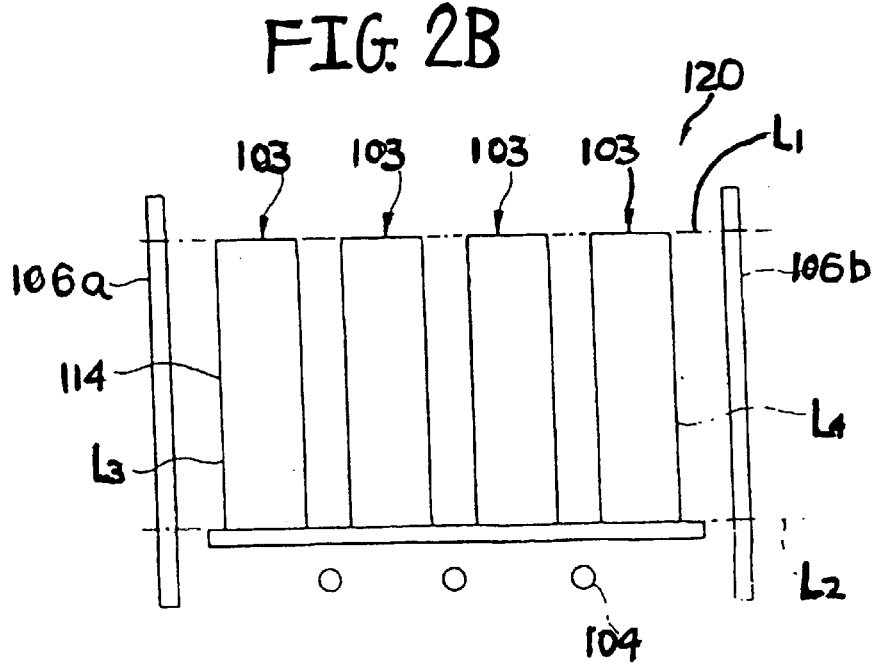

Referring to FIGS. 2A and 2B, the illustrated membrane separator assembly 120 comprises a membrane module unit 102 having a substantially parallelopipedal shape, a gas diffuser 104, and an enclosure subassembly. The membrane module unit 102 includes a plurality of parallel-arranged flat-type membrane modules 103. Each of the modules 103 comprises a vertically extending, sheet-type separating membrane 113 and two vertically extending, membrane fixing members 114 located at opposite sides of the separating membrane 113. As will be discussed in further detail below, one or both of the membrane fixing members 114 also serve as filtrate collecting members.

The gas diffuser 104 is provided below the separating membranes 113 and is constructed and arranged to diffuse a gas and clean the surfaces of the separating membranes 113 with a gas-liquid mixed flow generated by the diffused gas.

The enclosure subassembly comprises enclosure wall structures 106a and 106b. The membrane module unit 102 is positioned to be in a vertically extending area interposed between the enclosure wall structures 106a and 106b. (See FIGS. 5–12.) The enclosure subassembly can completely surround the membrane module unit 102 as discussed below (see FIG. 28), or can only partially enclose the membrane module unit 102, as in the case of enclosure wall structures 106a and 106b of FIG. 2. The enclosure wall structures 106a and 106b are arranged substantially parallel with the membrane modules 103 and are spaced from outermost ones of the membrane modules 103 to provide an clearance for permitting the object liquid 101a to move between the membrane separator unit 120 and the enclosure wall structures 106a and 106b in the vertical direction.

The enclosure wall structures 106a and 106b of the enclosure subassembly may be connected to one another or, alternatively, may be unconnected. However, when connected, the connectors should not prevent object liquid from passing along the entire length of the enclosure wall subassembly in the vertical direction. For example, where cross bars are selected as the connectors, the cross bars should be arranged, such as with spaces therebetween, for permitting the passage of object liquid. If a plate extending horizontally between the enclosure wall structures is selected as the connector, the plate should include flow passages therethrough so as to permit liquid to flow through the enclosure wall subassembly in a vertical direction.

Although only a single membrane module unit 120 is illustrated in FIG. 1, it is to be understood that a plurality of membrane module units can be used, and that the membrane module units can be arranged in a continuous or discontinuous manner at predetermined or irregular intervals. It is also to be understood that a plurality of gas diffusers 104 may be used. For example, for each membrane module unit, there may be a corresponding gas diffuser.

As will be explained in greater detail below, a representative and non-exhaustive list of separator membranes 113 suitable for use in the present invention includes flat-type membranes, hollow yarn membranes, tubular membranes, and bag-type membranes, and combinations thereof. A non-exhaustive list of representative materials suitable for making the membrane modules 103 include cellulose, polyolefins, polysulfone, fluoropolymers such as PVDF (polyvinylidene fluoride) and PTFE (polytetrafluoroethylene), and ceramic materials, and combinations thereof. Other suitable materials include polyacrylonitrile, polyesters, polycarbonate, nylon, polyvinyl alcohol, cellulose, and silicon.

Appropriate pore diameters of the separating membranes 113 are not specially limited. It is possible to use separating membranes having average pore diameters in a range of from 0.001 $\mu$m to 0.1 $\mu$m, which are also known as ultrafiltration membranes. Another suitable type of separating membranes includes those having average pore diameters in a range of from 0.1 $\mu$m to 1 $\mu$m, which are also known as precision filtration membranes. It is understood, however, that the separating membranes 113 can have even smaller or larger pore diameters than those mentioned above. The selected size for the pore diameters generally depends upon the intended application, i.e., the particle diameters of substances in the object liquid to be subject to the solid-liquid separation. For example, separating membranes used for the solid-liquid separation of, for example, active sludge preferably have a pore diameter of not more than 0.5 $\mu$m, and separating membranes used for the filtration of clean water which requires the sterilization thereof preferably have a pore diameter of not more than 0.1 $\mu$m.

Figure 3:
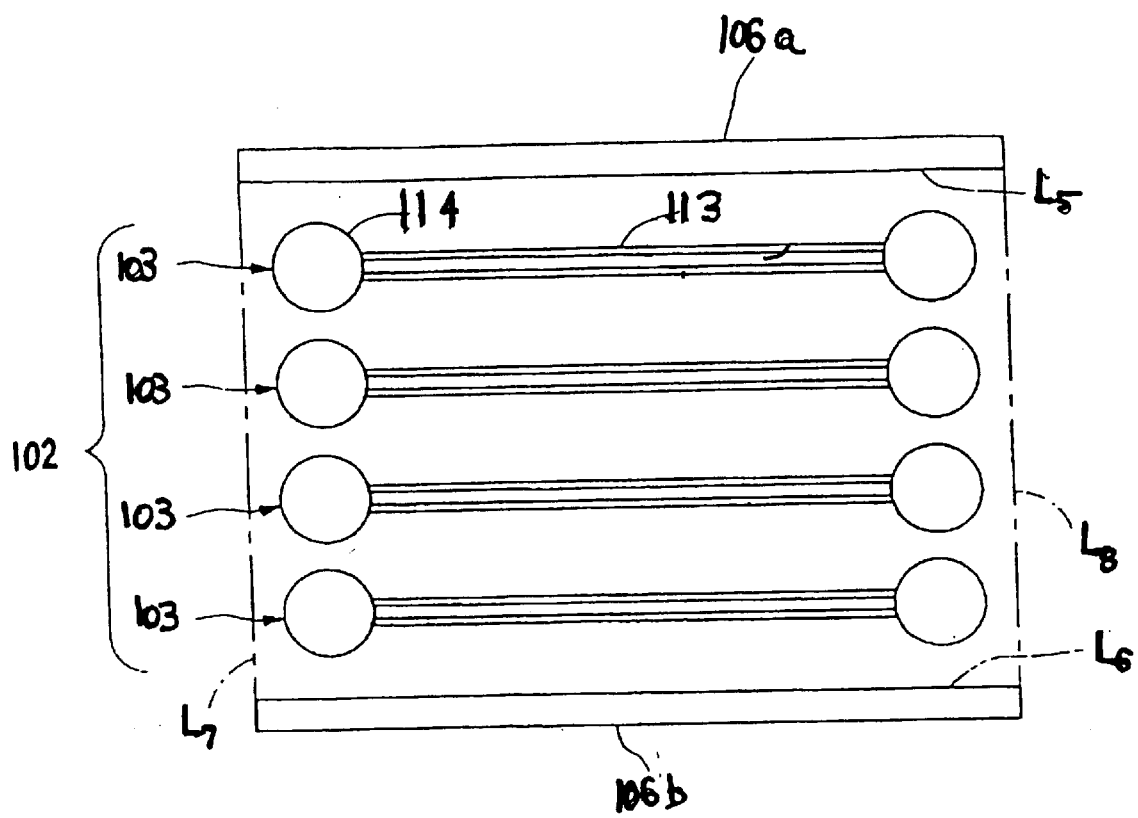
FIG. 3 is a plan view of the assembly of FIG. 1.
Figure 4:
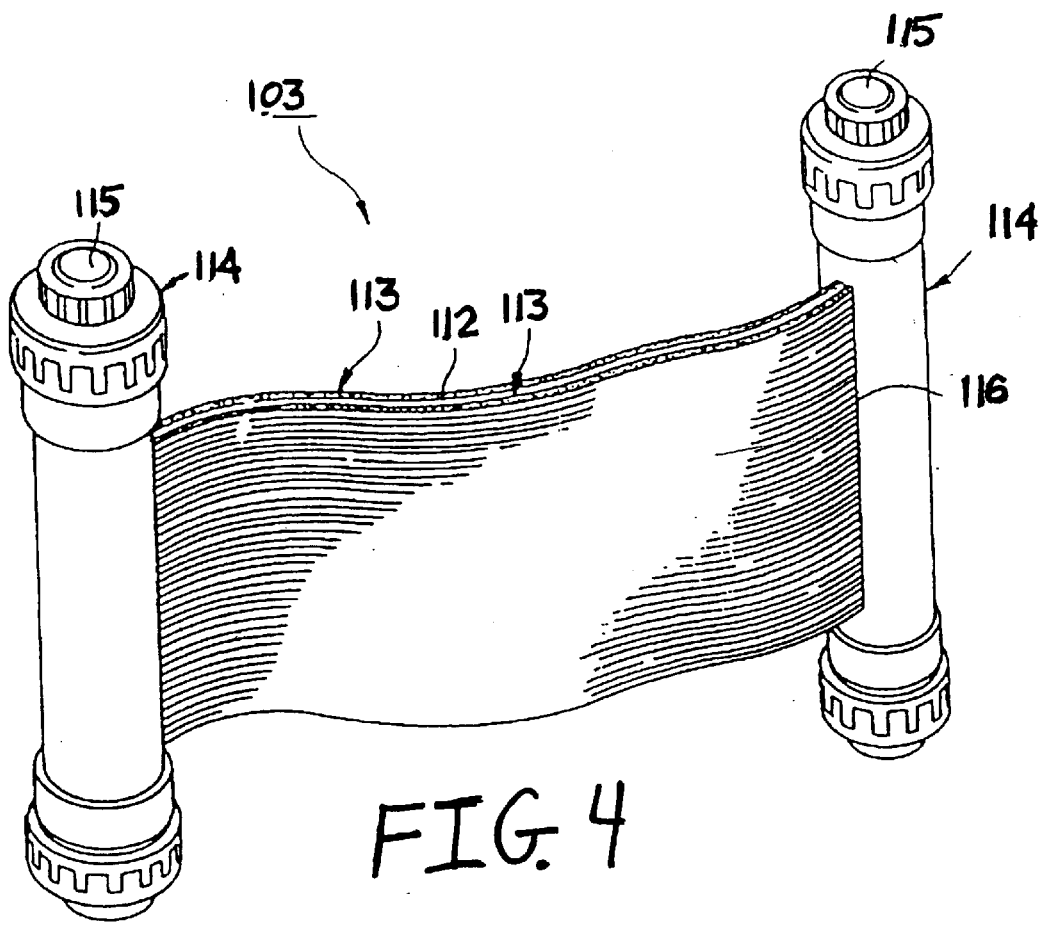
FIG. 4 is a perspective view of an alternative membrane module for the assembly of this invention.

FIGS. 3 and 4 show in greater detail one of the membrane modules 103 of the membrane module unit 102. In this illustrated embodiment, the two membrane fixing members 114 have respective central main passageways 115 and associated slits 116 extending radially from the associated central main passageway 115 to a periphery of the membrane fixing member 114. The separating membrane 113 comprises a knitted fabric (e.g., yam as weft yarn) comprising a plurality of hollow fibers arranged in series. This type of separating membrane 113 is also referred to as a hollow yarn membrane. The hollow yarn membrane 113 is fastened at end portions thereof to membrane fixing members 114 by fixing the end portions of the membrane 114 into the elongated slits 116 of the membrane fixing members 114. (Although the illustrated embodiment shows two membranes 113 extending between the membrane fixing members 114, it is to be understood that one membrane or more than two membranes may be used, and that different types of membranes may be used in combination.)

Figure 55:
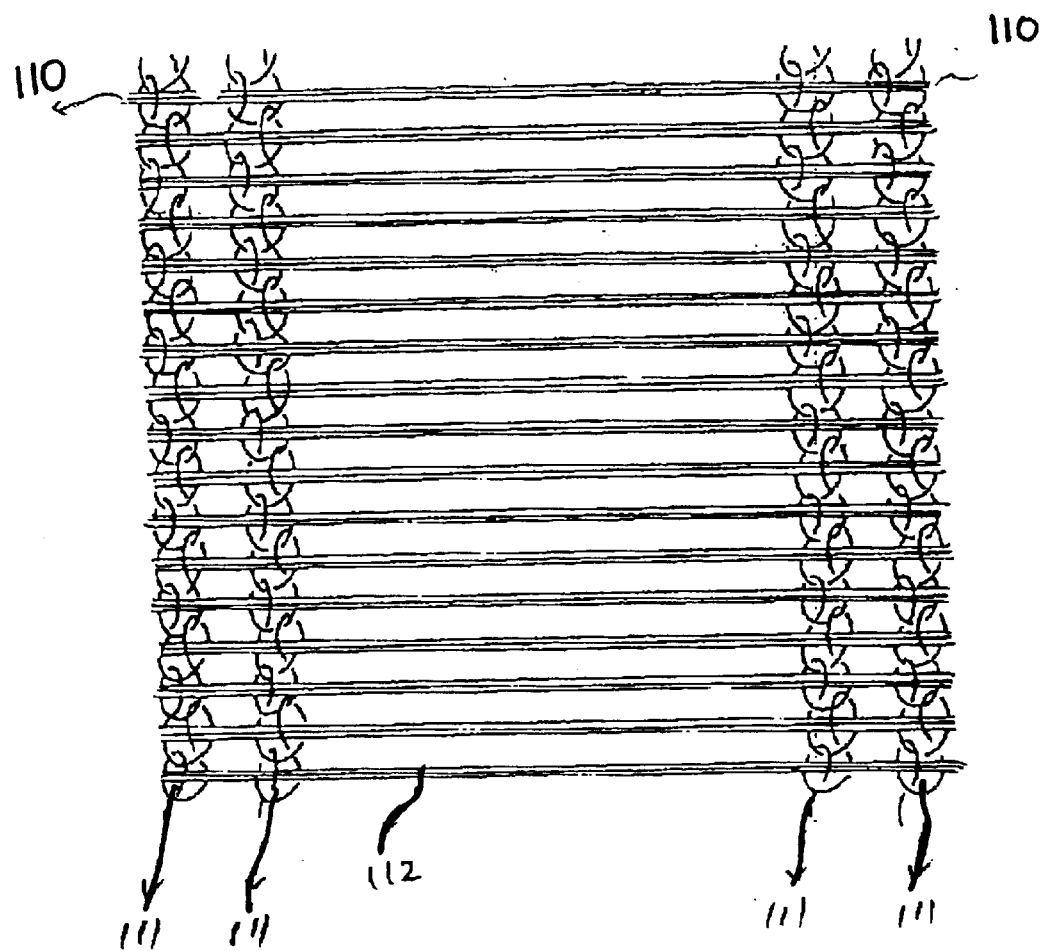
FIG. 55 is an example of a hollow yarn membrane according to another embodiment of the invention.

As discussed below in connection with FIG. 55, the hollow yarn membranes 113 can be manufactured by using knitted fabrics having regular yarn 111 as warp yarn, and hollow yarn 112 as weft yarn with openings 110 formed at end portions thereof. Generally, the yarn is formed of a material which is accessible to water via permeation through the separating membranes 113 and inaccessible to solids which are impermeable relative to the separating membranes 113. The hollow portions of the membranes 113 define membrane passageways which are in fluid communication with inner main passages 115 of the membrane fixing members 114. Suitable membranes, such as STERAPORE-HF series membranes, are available from Mitsubishi Rayon Co., Ltd. of Tokyo, Japan.

A synthetic resin (for example, an epoxy resin) is applied in the slits, but around the periphery of the membranes 113, so as to possess an elongated, substantially rectangular cross section. The synthetic resin fixes the hollow yarn membrane 113 to the inside of the slits 116 and seals inner main passages 115 of the membrane fixing members 114 in a liquid-tight manner. The hollow yan membranes 113 are especially useful for sludge treatment, since sludge rarely causes the hollow yarn membranes 113 to gather in a unitary solidified body, and the scrubbing of the membranes 113 by the gas from the diffuser 104 can be done effectively.

Figure 56:
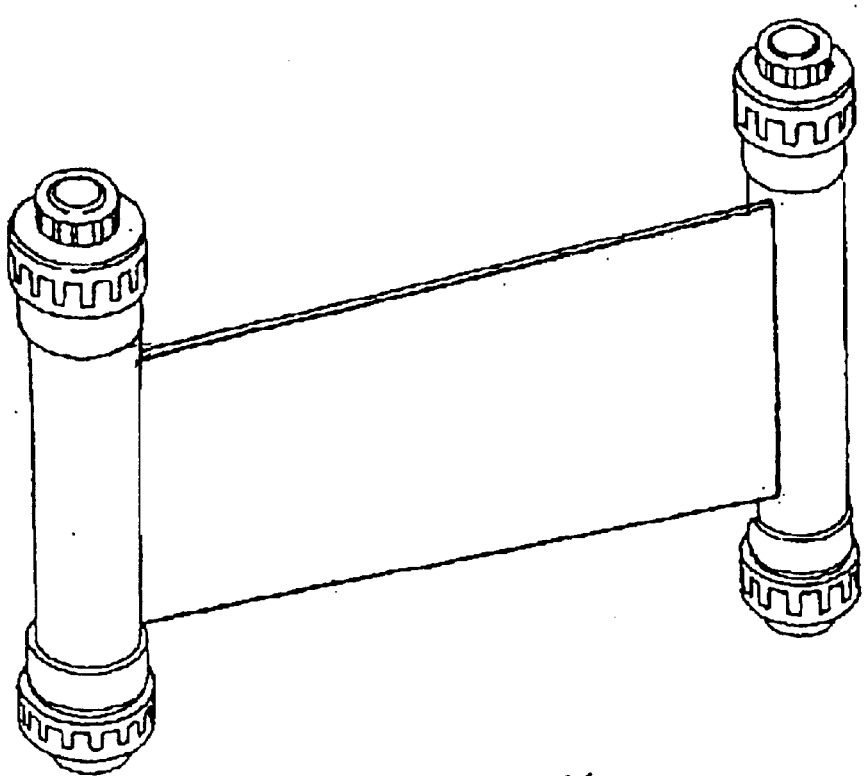
FIGS. 56 and 57 are respectively perspective and plan views of another embodiment of a membrane module suitable for use with the various embodiments of this invention.
Figure 57:
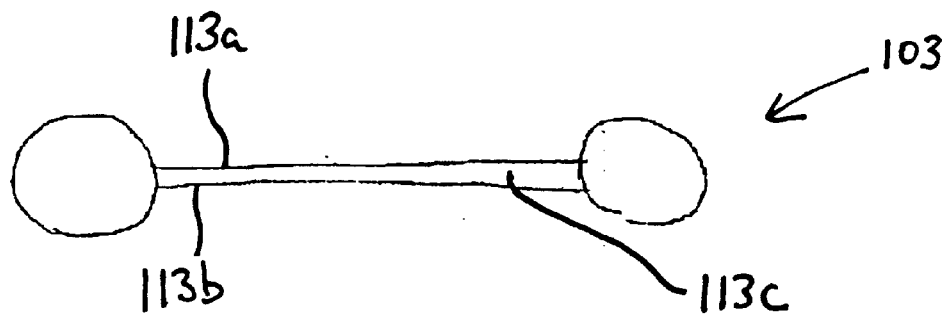

According to another embodiment shown in FIGS. 56 and 57, each of the modules 103 can include a pair of facing flat membranes 113a and 113b, so that the membranes 113a and 113b collectively define a channel 113c therebetween. As in the embodiment shown in FIG. 4, the edges of the membranes 113a and 113b can be disposed within slits 116 of the inner main passages 115 and sealed with a sealant. Generally, the membranes 113a and 113b are formed of a material which is accessible to water via permeation through the separating membranes 113a and 113b and inaccessible to solids which are impermeable relative to the separating membranes 113a and 113b.

Gas (e.g., air) fed to the diffuser 104 (via blower 105a) is discharged from gas discharge ports 104a of the gas diffuser 104 generates bubbles 104b, which reach the surfaces of the membrane modules 103 through the object liquid 101a, and pass through the portions of the object liquid 101a in the vicinity of the surfaces of the membrane modules 103 before being discharged from the liquid surface to the atmosphere. During this time, the bubbles 104b float up to the liquid surface through the object liquid 101a, so that an upwardly moving gas-liquid mixed flow comprising the object liquid 101a and bubbles 104b is generated. The gas-liquid mixed flow containing the bubbles 104b scrubs the surfaces of the separating membranes 113, thereby preventing solid matter from being deposited on and clogging the surfaces of the membranes 113.

As shown in FIGS. 2A, 2B, and 3, the enclosure wall structures 106a and 106b can be arranged on opposite sides (e.g., to the left and right) of the gas diffuser 104 to guide the gas discharged from the diffuser 104 to the separating membranes 113. Although not shown in FIGS. 1–4, another set of enclosure wall structures can be arranged on the remaining opposing sides (e.g., front and rear sides) of the gas diffuser 104 so that the enclosure wall structures are disposed on all four sides of the gas diffuser 104 so as to enclose the gas diffuser 104 from all sides. If only two enclosure wall structures are used, performance is enhanced by disposing the enclosure wall structures parallel to the separating membranes 113 as depicted in FIGS. 2A, 2B, and 3, rather than perpendicular to the separating membranes 113.

Although the enclosure wall structures 106a and 106b are shown having a flat-type configuration, it is to be understood that the enclosure wall structures 106a and 106b can have corrugated or other configurations. Representative materials for the enclosure wall structures include, by way of example, resins, metals and ceramic materials. Flat plate type enclosure walls and corrugated plate type enclosure walls can be used.

Figure 5:
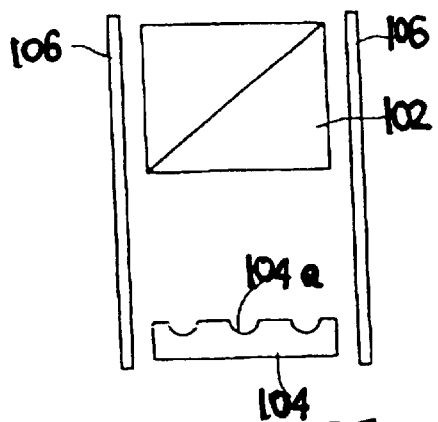
FIGS. 5–12 are side views of various arrangements of the membrane module unit, diffuser, and opposing enclosure wall structures of the assembly.
Figure 6:
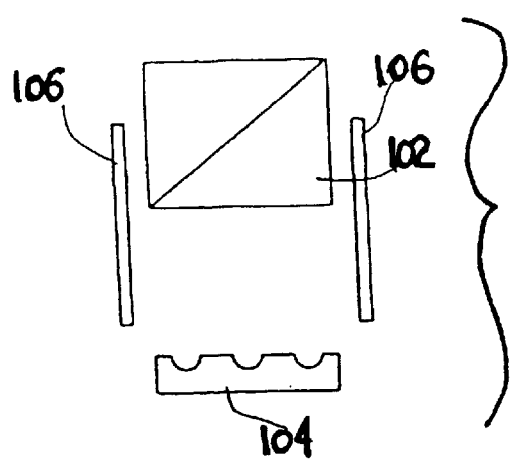
Figure 7:
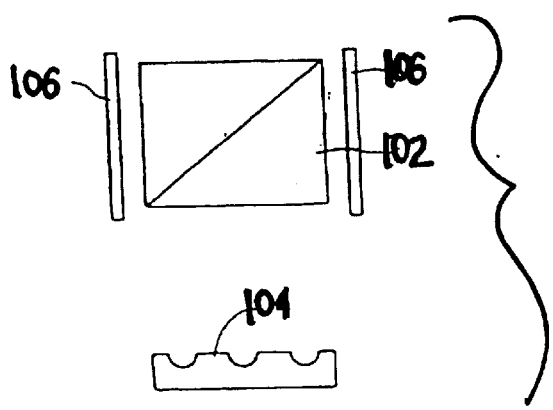
Figure 8:
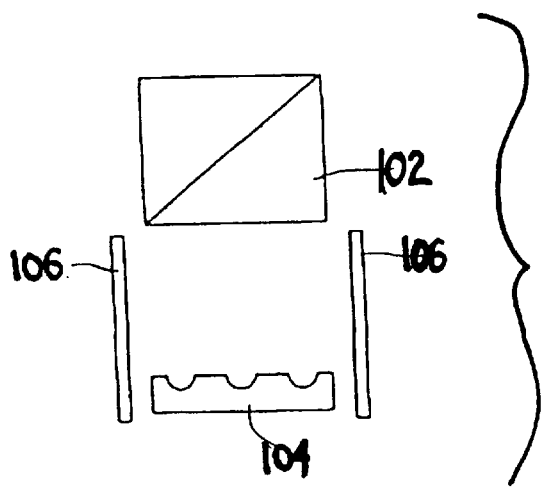
Figure 9:
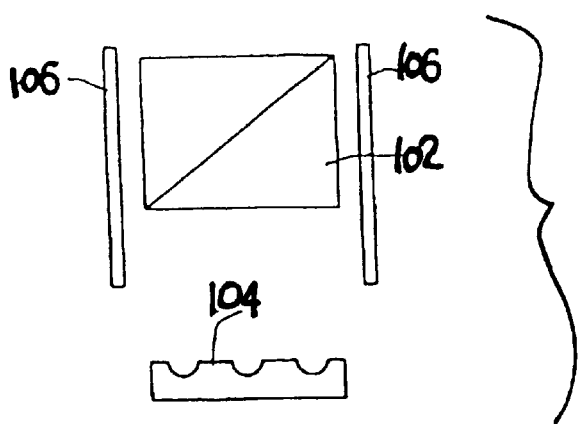
Figure 10:
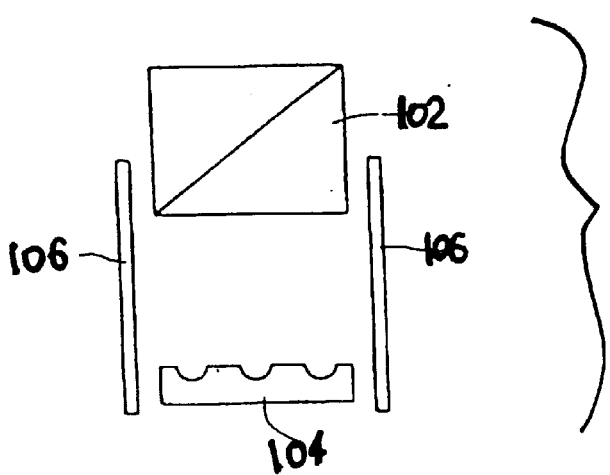
Figure 11:
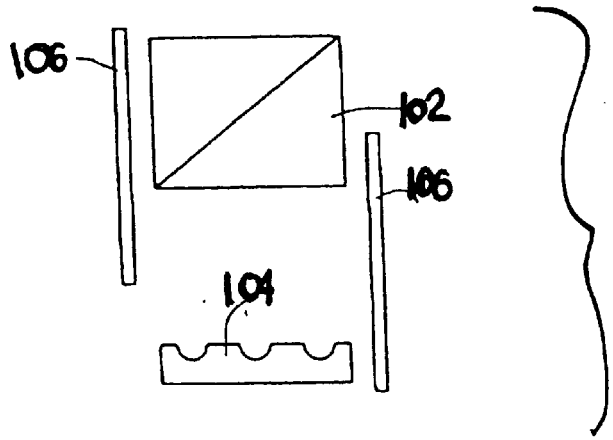
Figure 12:
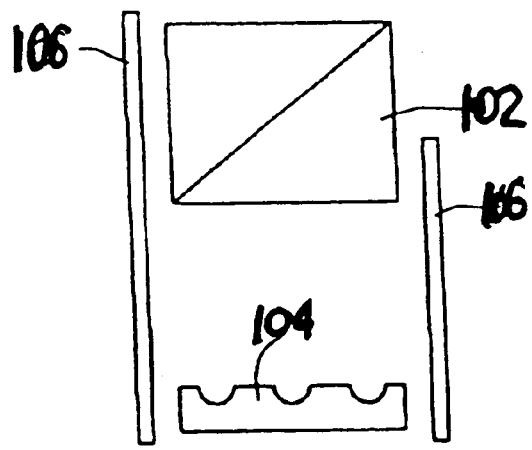

As best shown in FIG. 5, the enclosure wall structures 106 (when viewed from a side view) may coextend in a continuous manner along the entire respective lengths of the membrane module unit 102 and the gas diffuser 104 to promote efficient scrubbing of the separating membranes 113. Alternative arrangements may also be used, such as those shown in FIGS. 6–10, in which the enclosure wall structures 106 extend along only portions of the membrane module unit 102 and/or the gas diffuser 104. For example, FIG. 6 shows an example in which the enclosure wall structures 106 do not extend along the gas diffuser 104, but extend along portions of the length of the side surfaces of the membrane module unit 102. FIG. 7 is an example in which the enclosure wall structures 106 extend along side the entire length of the membrane module unit 102, but do not extend along the length of the gas diffuser 104. FIG. 8 depicts an example in which the enclosure wall structures 106 do not coextend with the side surfaces of the membrane module unit 102, but do extend along the entire side surfaces of the gas diffuser 104, with upper portions of the enclosure wall structures 106 protruding towards the membrane module unit 102. FIG. 9 is an example in which the enclosure wall structures 106 do not coextend along the length of the gas diffuser 104, but do coextend along the entire side surfaces of the membrane module unit 102, with lower portions of the enclosure wall structures 106 projecting toward the gas diffuser 104. FIG. 10 is an example in which the enclosure wall structures 106 continuously coextend along the entire side surfaces of the gas diffuser 104, but extend along only a portion of the membrane module unit 102. FIG. 11 depicts an arrangement in which only portions of the enclosure wall structures 106 overlap in length, while FIG. 12 depicts an example in which the enclosure wall structures 106 have different heights. Although it is preferable that each of the enclosure wall structures 106 be continuous as shown in the illustrated embodiment, the structures may be discontinuous, so that separate and distinct portions of the enclosure wall structures 106 extend along the membrane module unit 102 and the diffuser 106.

It is also preferable that the membrane fixing members 114 of the membrane module unit 102 be arranged in close proximity to one another in the lateral direction as shown in FIGS. 2B and 3. By placing the membrane fixing members 114 in close proximity to one another, i.e., with small clearances therebetween, the membrane fixing members 114 collectively serve a similar function to the enclosure wall structures 106, so that enclosure walls can be excluded from the sides of the membrane module unit 102 which are perpendicular to the membrane modules 103.

In this manner, the object liquid 101 is permitted to pass through the clearances between the membrane fixing members 114 and move from the inside of the membrane module unit 102 to the outside thereof, or in the reverse direction. Therefore, a turbulent flow occurs, and liquid cleaning efficiency increases.

Figure 13:
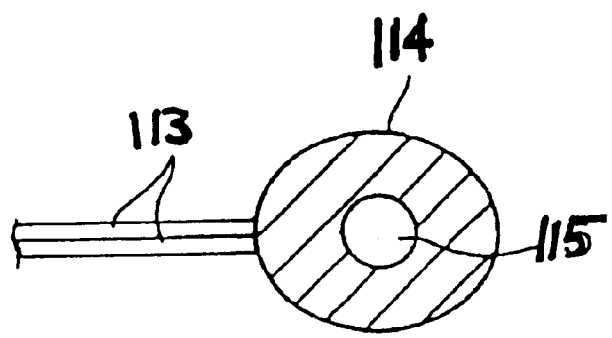
FIGS. 13–24 are sectional views of various embodiments of the membrane fixing member, illustrating various sectional shapes that the membrane fixing member may possess.
Figure 14:
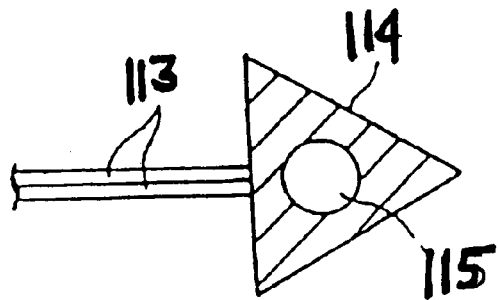
Figure 15:
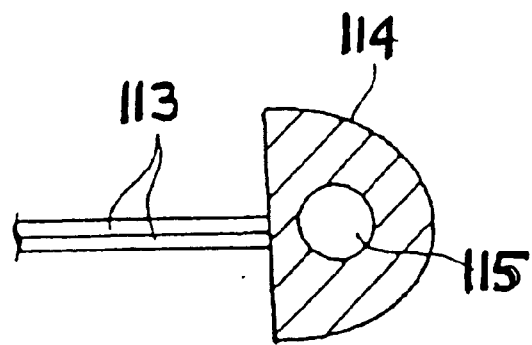
Figure 16:
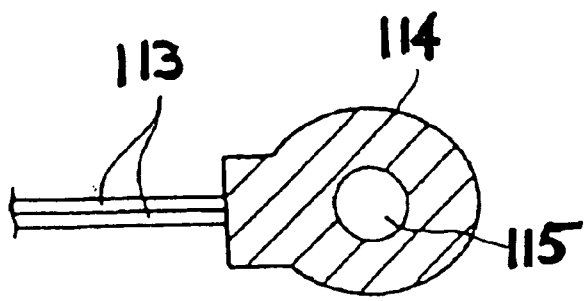
Figure 17:
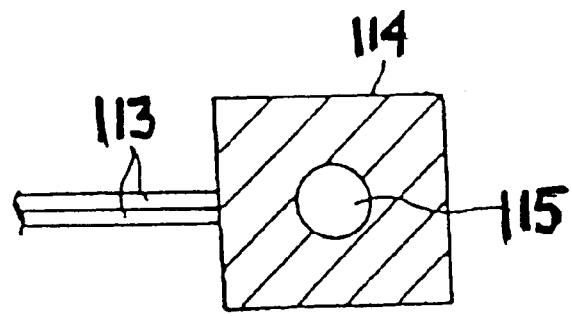
Figure 18:
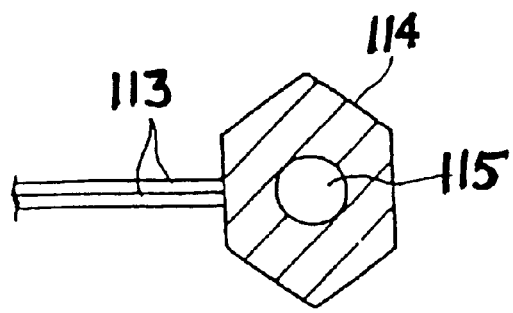
Figure 19:
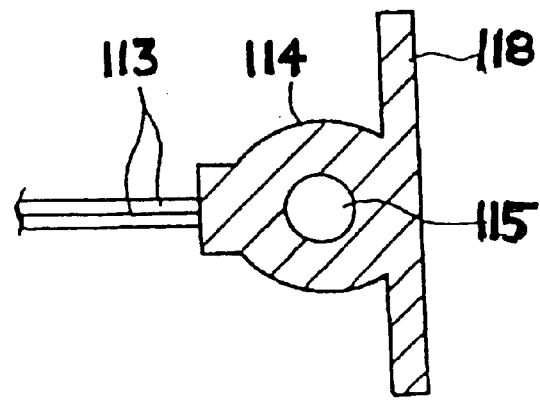

As mentioned above, the membrane fixing members 114 are hollow so as to define a central main passageway 115. In the illustrated embodiments, the membrane fixing members 114 are rod shaped and the central main passageway 115 has a circular cross section. It is to be understood, however, that the membrane fixing members 114 and/or the central main passageway 115 may have various other shapes, such as, by way of example, circular (FIG. 13), triangular (FIG. 14), semicircular (FIG. 15), elliptic (FIG. 16), square (FIG. 17), polygonal (FIG. 18), or otherwise. As evident from FIGS. 13–18, the cross-sectional shape of the membrane fixing members 114 may be selected independently of the cross-sectional shape of the main passageway 115.

Figure 20:
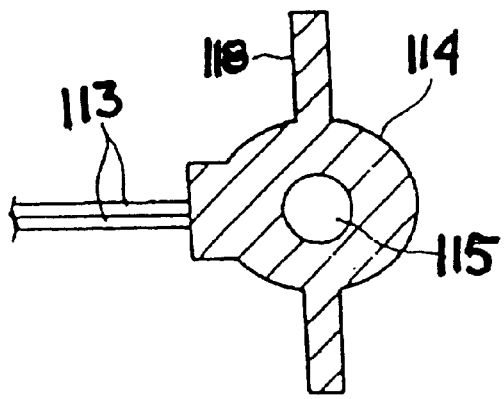
Figure 21:
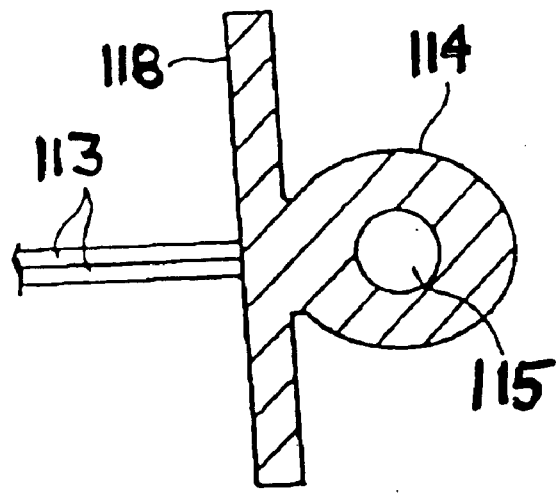
Figure 22:
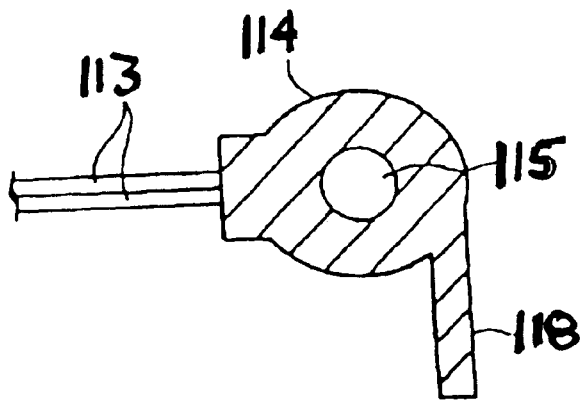
Figure 23:
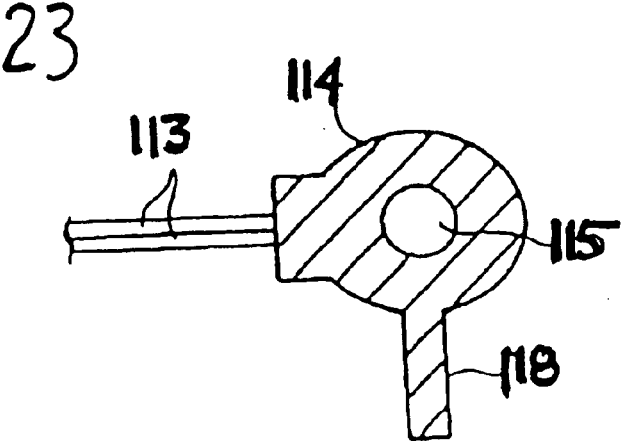
Figure 24:
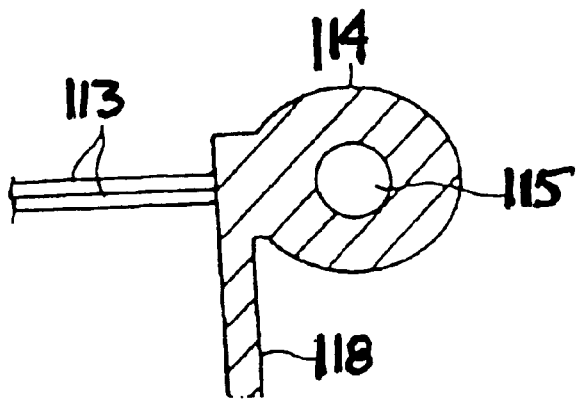

As shown in FIGS. 19–24, the clearances between membrane fixing members 114 of adjacent modules 103 can be reduced by providing laterally extending projections 118 on one or more or all of the membrane fixing members 114. Each of the membrane fixing members 114 can contain one or a plurality of laterally extending projections 118. As shown in FIGS. 20 and 23, the laterally extending projections may be radially aligned with the membrane fixing members 114 or, as shown in FIGS. 19, 21, 22, and 24, tangential to the membrane fixing members 114.

In order to further explain the invention, the following terms will be defined.

As referred to herein, the side surface area of the membrane module unit 102 represents the area, taken from a side view facing the sides of the membrane fixing members 114, of a rectangular area defined by vertical peripheral portions of the outermost membrane modules 103, a horizontal line passing the upper apexes of the membrane modules 103, and a horizontal line passing the lower apexes of the membrane modules 103. For example, the side surface area of the membrane module unit 102 shown in FIG. 2B is defined by lines L3 and L4 passing through vertical peripheral portions of the outermost membrane modules 3 and horizontal lines L1 and L2 respectively passing through the upper and lower apexes of the membrane modules 103. If the membrane modules 103 are arranged at have different heights, the top of the side surface area is defined by the horizontal line passing through the highest apex or apexes of the membrane modules and the bottom of the side surface area is defined by the horizontal line passing through the lowest apex or apexes of the membrane modules 103.

As referred to herein, the side surface area of the membrane fixing members 114 in the membrane separator unit 102 shown in FIGS. 2A and 2B represents the sum of the side surface areas of the four membrane fixing members 114, which are best shown in FIG. 2B.

As referred to herein, the horizontal cross-sectional area of the membrane module unit 102 represents a horizontal cross-sectional area of a substantial parallelopiped defined by the inner portions of the opposing enclosure wall structures 106. For example, in the membrane separator unit 102 shown in FIG. 3, the horizontal cross-sectional area of the membrane module unit 102 represents a rectangular area defined by an inner line L5 of the enclosure wall structure 106a, an inner line L6 of the other enclosure wall structure 106b, a line L7 connecting left end portions of the enclosure wall structures 106a and 106b, and a line L8 connecting right end portions of the enclosure wall structures 106a and 106b.

It is preferable that the side surface area of the membrane fixing members 114 constitute from 30% to 100% of the side surface area of the membrane module unit 102. Setting the lower end of this range to 30% is preferable to avoid excessive escape of the diffused bubbles 104b to the outside of the membrane modules 103, and setting the lower end of this range to not less than 40% is more preferable. It is preferable that the upper end of this range be not more than 99% in order to allow for turbulent flow to be generated by the horizontal movement of the object liquid 101a.

However, even arranging the membrane modules 103 to a 100% percentage is acceptable insofar as this arrangement obviates the need for enclosure wall structures positioned perpendicularly to the membrane modules 103, thereby decreasing the cost of the membrane module unit 102.

The methods of operating the membrane separator according to the present invention include an immersion suction filtration method and a gravity filtration method based on a water head difference.

A method of operating the above-described membrane separator assembly 120 having hollow yarn membranes 113 will now be described with reference to FIGS. 1–4. The inner main passageways 115 of the membrane fixing members 114 are connected to a suction pump 105b via the recovery passage 102'. The main passageway 115 are in fluid communication with the membrane passageways defined with the hollow yarn membranes 113. By operating the suction pump, the object liquid 101a is suction filtered through the hollow yarn membranes 113. Because the membrane passageway are accessible to water via permeation through pores of the separating membranes 113 and inaccessible to solids which cannot pass through the pores of the separating membranes 113, water is passed through the hollow yarn membranes 113 while undesired solids are not, thereby effecting the solid-liquid separation. The filtrate reaching the membrane passageways of the hollow yarn membranes 113 flows therefrom to the inner main passageways 115 through the slits 116 of the membrane fixing members 114, and is discharged to the outside of the treatment vessel 100 through the pipe 102'. Consequently, sludge is collected on the surfaces of the hollow yarn membranes 113.

Operation of the gas diffuser 104 prevents undesired clogging of the membranes 113. When the membrane cleaning effect is taken into consideration, the discharge rate of a gas during a gas diffusion operation is preferably set to 10–150 NM$^3$/m$^2$/hr per the horizontal cross-sectional area of the membrane module unit 102 (10–150 normal cubic meter per cross-sectional area of 1 m$^2$ and per 1hour). When a dissolution rate of oxygen and economical efficiency are additionally taken into consideration, the gas discharge rate is more preferably set to 20–100 Nm$^3$/m$^2$/hr.

In this arrangement, an average vertical velocity ($V_1$ in FIG. 1) of the gas-liquid mixed flow in the region of the membrane modules 103 can be regulated by adjusting the gas diffusion rate within the above-mentioned range by regulation of blower 105b. In view of the necessity of improving the cleaning effect by generating a gas-liquid mixed flow, this average moving velocity of flow is preferably set to at least 0.01 m/sec, and, preferably at least 0.05 m/sec. In order to prevent the exertion of an excessive force capable of breaking the membrane modules 103, it is preferable to set an upper limit of the average moving velocity of flow to 1.5 m/sec, and more preferable to 1 m/sec.

An average horizontal velocity ($V_2$ in FIG. 1) of the gas-liquid mixed flow in the region of the membrane modules 103 can be regulated by adjusting the clearances among the membrane fixing members 114 within the above-mentioned range and the gas diffusion rate within the above-mentioned range. In order to improve cleaning performance by generating a turbulent flow, the lower limit of this average moving velocity of flow is preferably set to 0.01 m/sec, and more preferably 0.05 m/sec. In order to prevent the exertion of an excessive force capable of breaking the membrane modules 103, the upper limit of this average moving velocity of flow is preferably set to 1.5 m/sec, and more preferably 1 m/sec.

The moving velocity of flow in the vertical or horizontal direction of the gas-liquid mixed flow on the membrane surfaces can be determined approximately by measuring the moving speed of the gas-liquid mixed flow in the vicinity of the membrane modules 103 by, for example, a method of optically measuring the moving speed of particles and bubbles in the object liquid, or with an electromagnetic counter-flow meter utilizing an induction current based on a Faraday effect. The average moving speed represents an average value of the moving speeds of the gas-liquid mixed flow measured by the above-mentioned method at at least two points, e.g., a central portion and an end portion of the membrane modules 103, preferably at not less than two points at least two times at an interval of 50–60 minutes, and more preferably not less than two times.

An example of another embodiment of the present invention will now be described in connection with FIG. 25, which shows another liquid-solid separating membrane assembly 220.

The basic construction of assembly 220 is identical to that of the assembly 120 shown in FIG. 1. Unlike assembly 120, however, the assembly 220 depicted in FIG. 25 includes enclosure wall structures 206a and 206b having, in at least portions thereof, passages 207. The passages 207 are constructed and arranged to pass object liquid from the interior of the membrane module unit 202 to the exterior of the unit 202 or in the opposite direction, i.e., from the exterior to the interior of the membrane module unit 202. When two enclosure wall structures 206a and 206b are positioned as shown in FIG. 26, the passages 207 may be provided in one or both of the enclosure wall structures 206a and 206b. When a plurality of membrane modules 203 (having membranes 213) are used, the passages 207 are preferably provided in the both enclosure wall structures 206a and 206b (as shown in FIG. 26) to uniformly clean all of the membrane modules 203.

Figure 27:
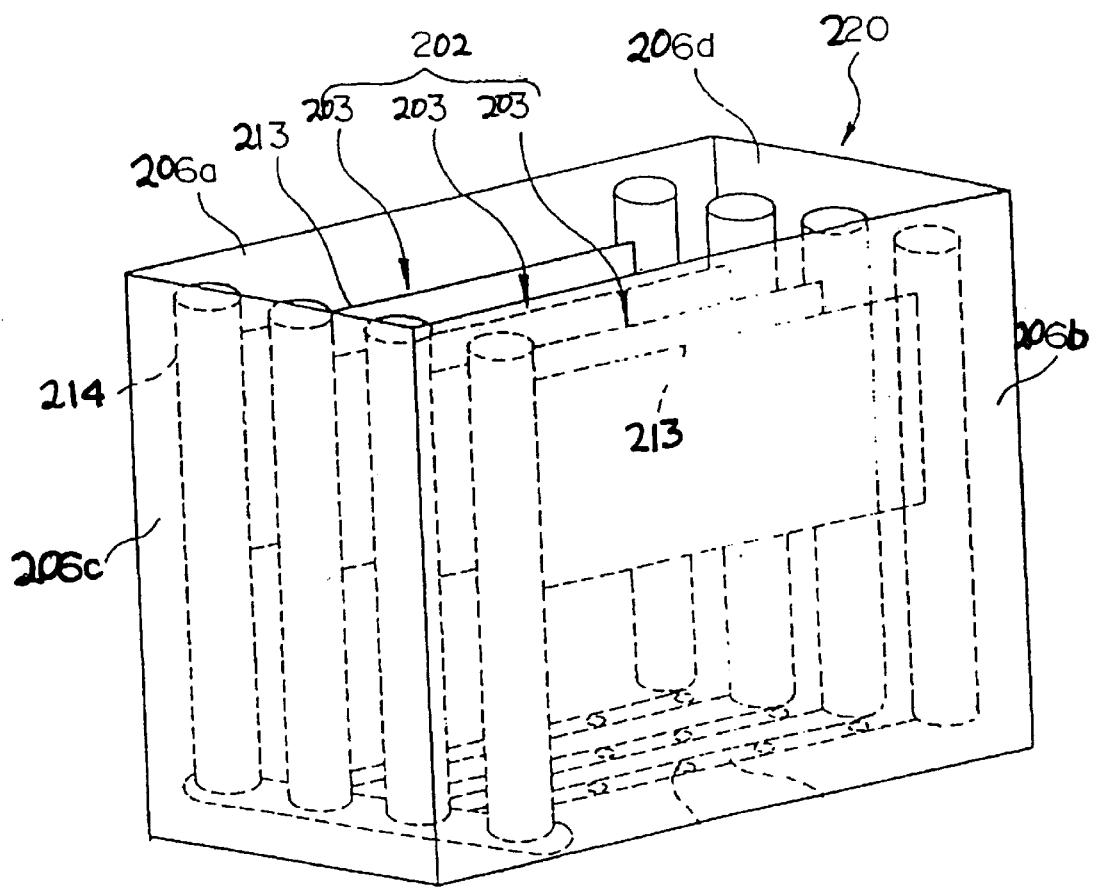
FIG. 27 is a variation of FIG. 26, depicting four enclosure wall structures enclosing the membrane module unit.
Figure 28:
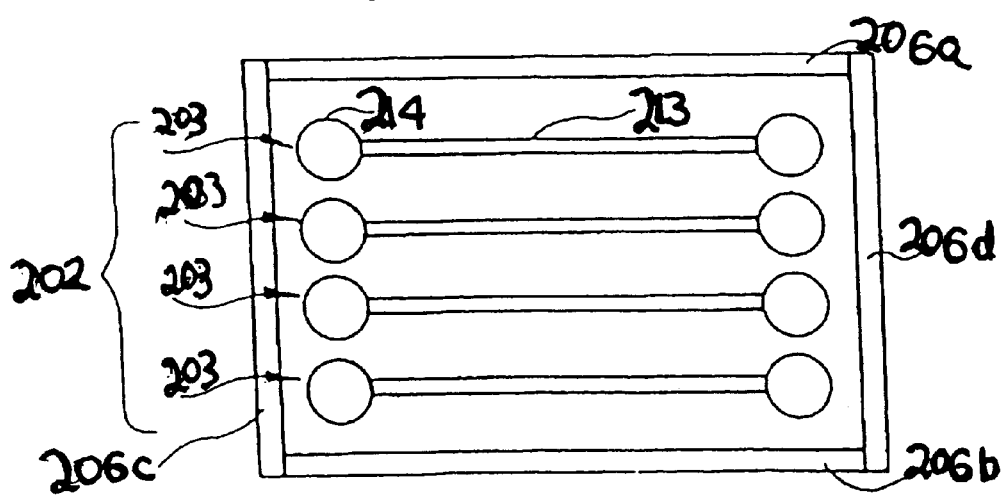
FIGS. 28–30 are plan views of variations of the assembly of FIG. 25.
Figure 29:
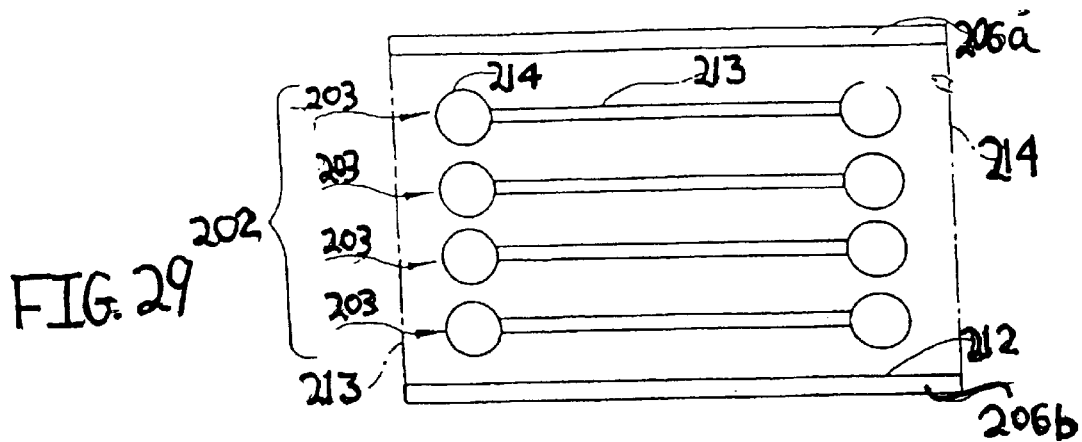
Figure 30:
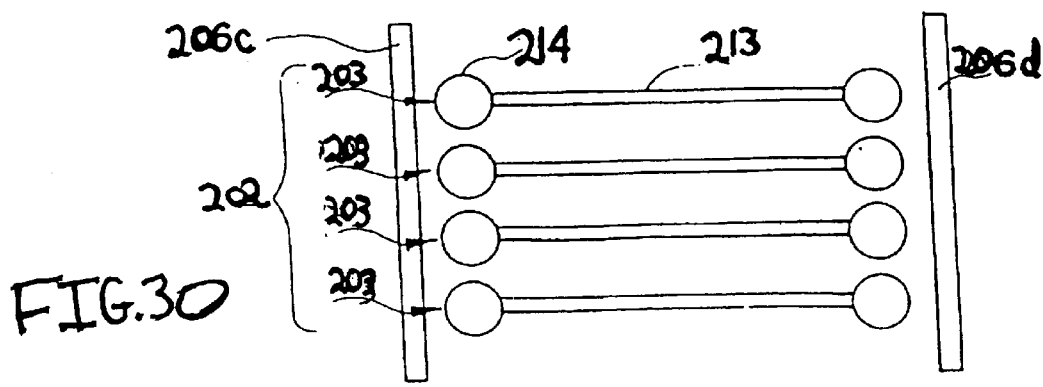
Figure 31:
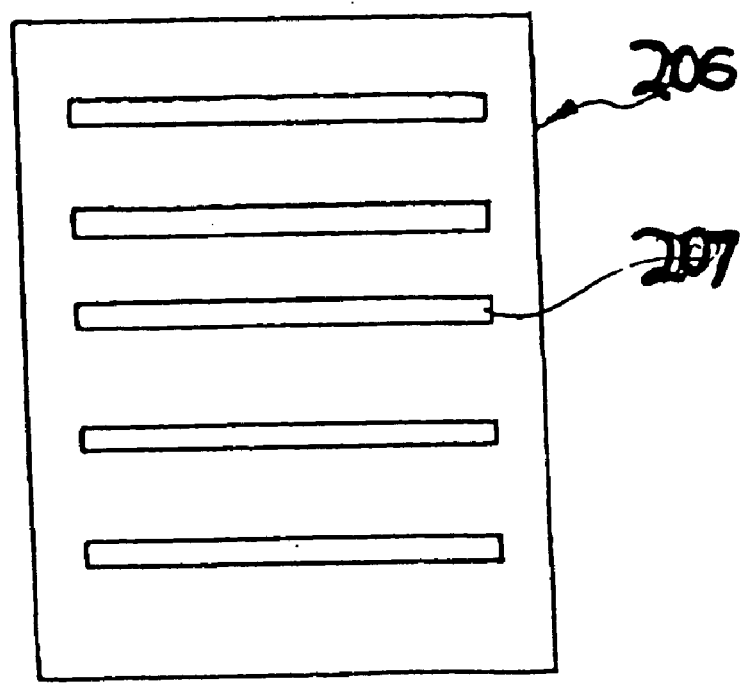
FIGS. 31–39 are elevational views of various examples of the enclosure wall structures.
Figure 32:
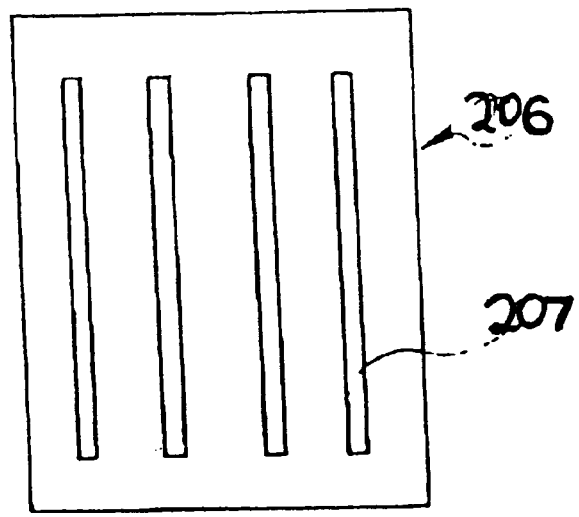
Figure 33:
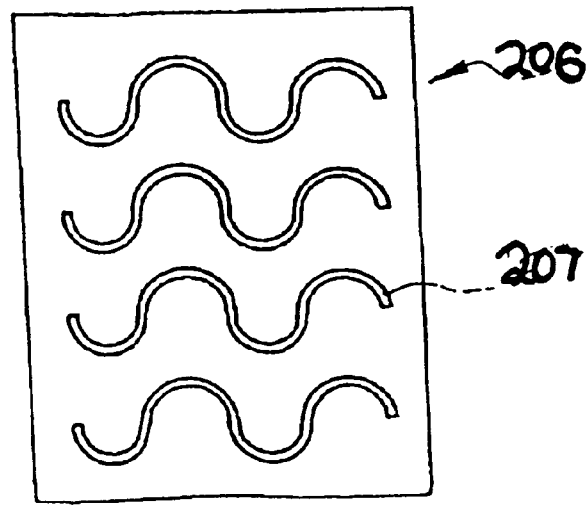
Figure 34:
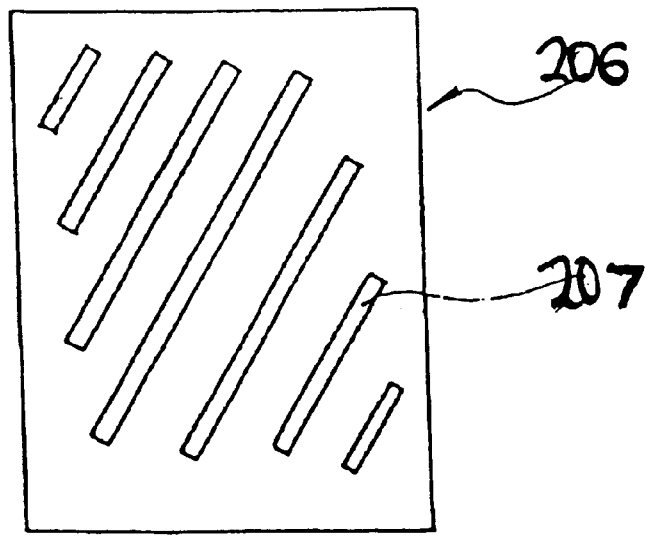
Figure 35:
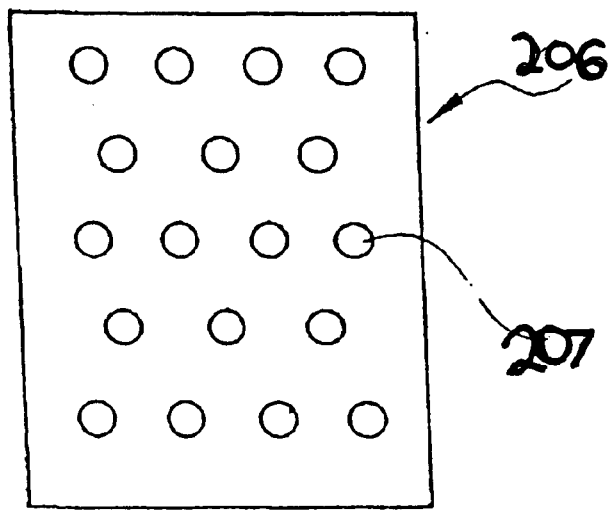
Figure 36:
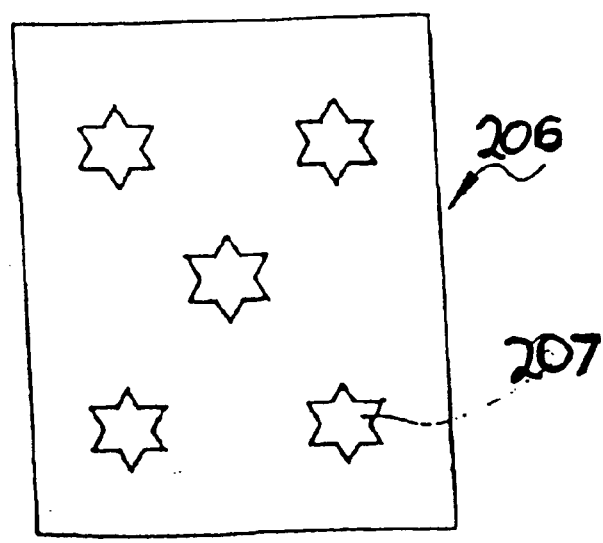
Figure 37:
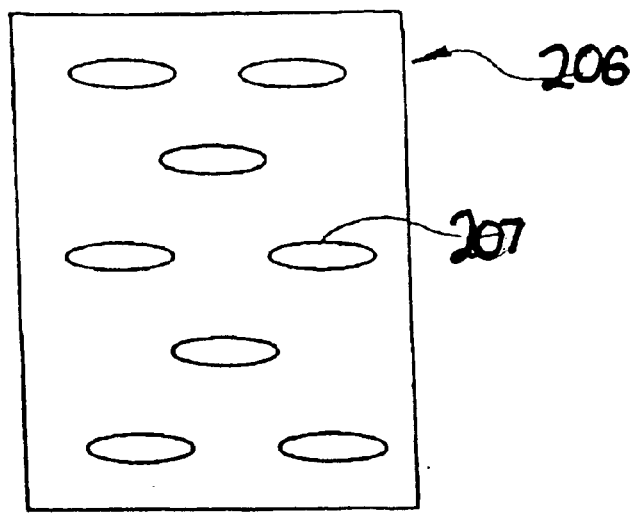
Figure 38:
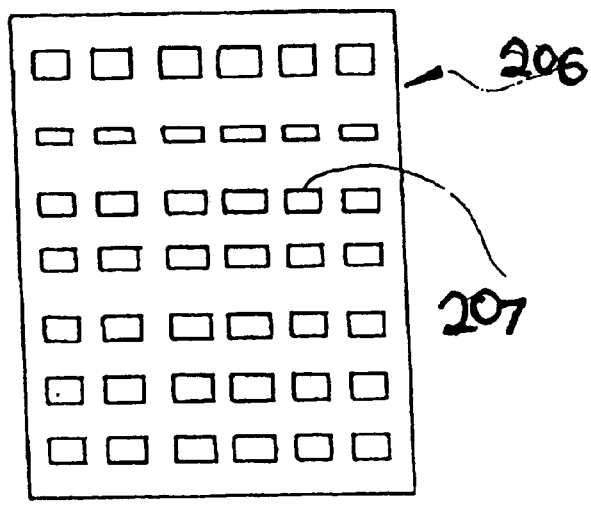

When four enclosure wall structures 206a, 206b, 206c, and 206d are provided as shown in FIGS. 27 and 28, the passages 207 (not shown in FIG. 27) may be provided in all or some of the enclosure wall structures 206a–206d. However, when a plurality of membrane modules 203 are used, the passages 207 are preferably provided in two opposing enclosure wall structures 206a, 206b (FIG. 29) or 206c, 206d (FIG. 30) to uniformly clean each of the membrane module 203.

Figure 39:
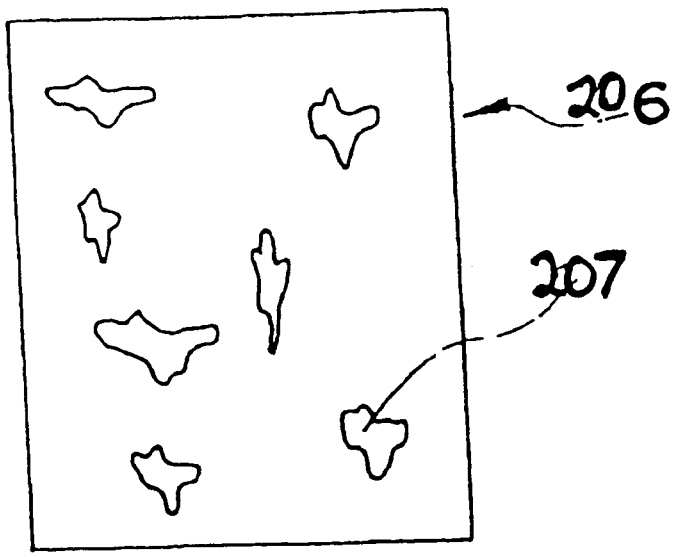

FIGS. 31–39 are representative, yet not exclusive or exhaustive, examples of various configurations suitable for the passages 207. As shown in the figures, suitable configurations for the passages 207 of the enclosure wall structures 206 include elongated horizontal rectangular slits (FIG. 31), elongated vertical rectangular slits (FIG. 32), slits having sinusoidal patterns (FIG. 33), elongated slanted rectangular slits (FIG. 34), circular slits (FIG. 35), star-shaped holes (FIG. 36), elliptical holes (FIG. 37), polygonal holes (FIG. 38), and random, irregular holes (FIG. 39). The distribution of the passages 207 is not specially limited either. The passages 207 may be regularly or irregularly distributed.

Where the passages 207 are provided, preferably the passages 207 constitute at least 1% of the total surface area of their associated enclosure wall structure 206 so as to permit movement of object liquid therethrough. The passages 207 preferably constitute no more than about 60% of the total surface area of their associated enclosure wall structure 206, since excess flow of object liquid through the enclosure wall structures 206 decreases the membrane surface cleaning efficiency achieved during operation.

The enclosure wall structures 206 having the passages 207 can be manufactured by subjecting plate-type materials to punching, cutting or boring to form holes 207. The cross-sectional area of each of the passages 207 is preferably not less than about 10 mm².

Figure 40:
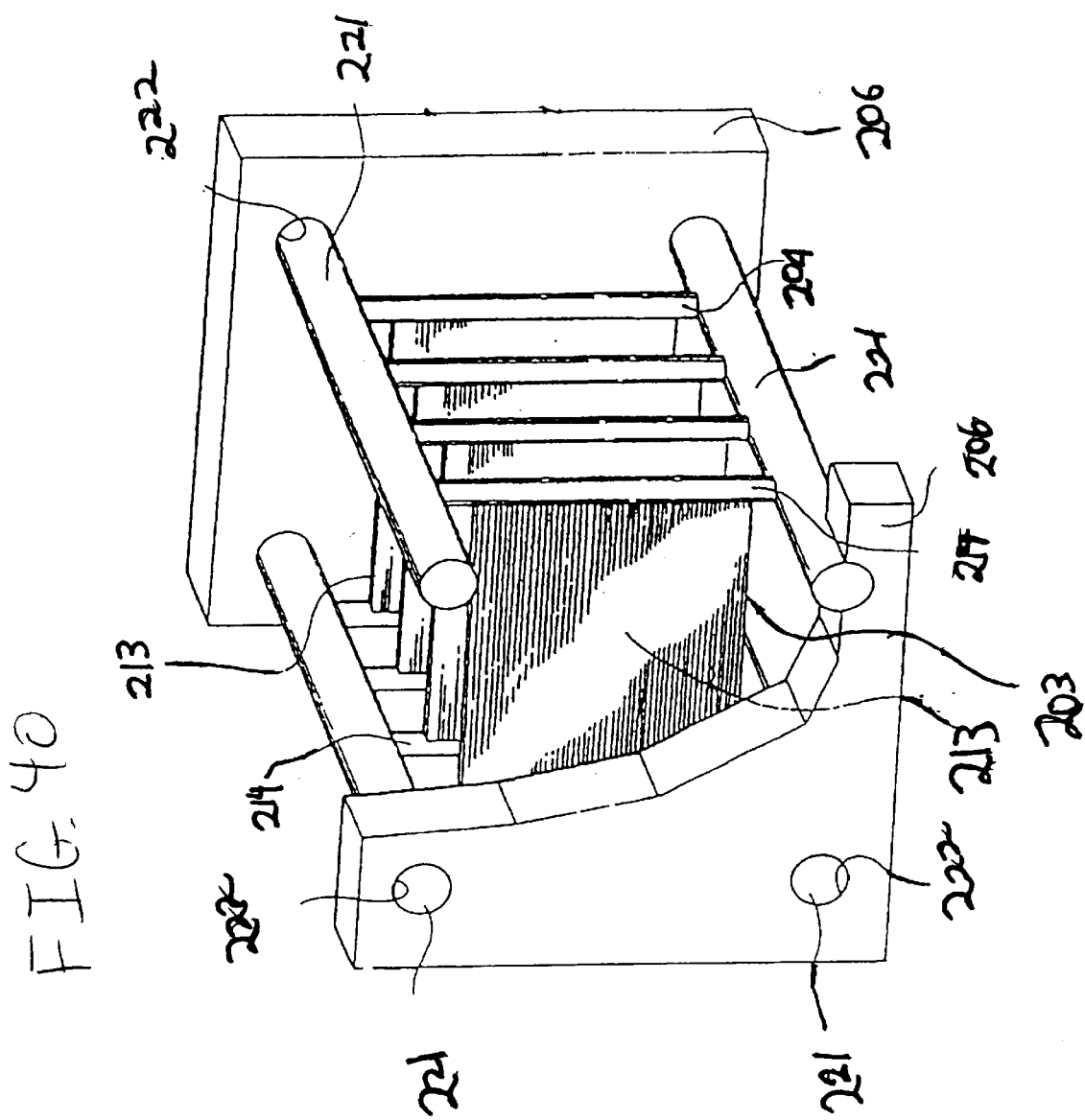
FIGS. 40 and 41 are respectively perspective views illustrating the attachment of opposing enclosure wall structures.

Attachment of the enclosure wall structures 206 to each other will now be described with reference to FIG. 40. As shown in FIG. 40, a plurality of membrane modules 203 are arranged parallel to. and interposed between the enclosure wall structures 206. A plurality of rod-like connectors 221 extend between and connect the enclosure wall structures 206. Although four connectors 221 are depicted in the illustrated embodiment, it is understood that a lesser or greater number of connectors 221 can be used, although preferably there is at least four connectors 221 respectively provided at the four corners of the enclosure wall structures 206. Also, although the connectors 221 are depicted having a rod-like shape with circular cross section, it is to be understood that other shapes, such as those having elliptical, polygonal, varying, or random cross sections can be used.

The enclosure wall structures 206 and the connectors 221 can be attached to each other by any suitable method. For example, a bonding agent and/or screws can be used. In order to facilitate assembly, the enclosure wall structures 206 are preferably formed with receiving holes 222 into which ends of the connectors 221 can be inserted, the holes 222 being appropriately the same diameter of the ends of the connectors 221. Optionally, the receiving holes 222 and the ends of the connectors 221 can have complementary screw threaded surfaces. Additionally or in the alternative, mechanical fasteners and the like may be used.

Any material having sufficiently high strength to withstand external forces encountered during use can be chosen for making the connectors 221. By way of example, suitable materials include metals, ceramics, porcelain, and synthetic resins. Synthetic resins are preferably due to their low costs, high processability, light weight, and high handlability. Suitable synthetic resins include, by way of example, polycarbonate, polysulfone, polypropylene, polyethylene, acrylic resin, ABS resin and poly(vinyl chloride) resin.

It is to be understood that the present invention is not limited to containing the connectors 221 in the manner shown. Rather, the connectors 221 can be excluded from the assembly 220 so that the modules 203 are fixed to the enclosure wall structures 206 or, in the alternative, additional fixing members may be used. Nonetheless, joining the membrane fixing members 214 to connectors 221 is preferred, since this construction reduces the number of the constituent members and weight, and, hence, reduces manufacturing and laboring expenses.

The membrane fixing members 214 may be fixed to one or a plurality of connectors 221. When hollow parts such as, for example, resin pipes, are used as the connectors 221 and the connectors are jointed tightly with the membrane fixing embers 214, the connectors 221 also serve as filtrate collecting pipes for collecting he filtrate therein and recovering the same therethrough. The presence of additional low passageways in the connectors 221 is preferred for reducing the number of the onstituent members of the assembly 220.

Figure 41:
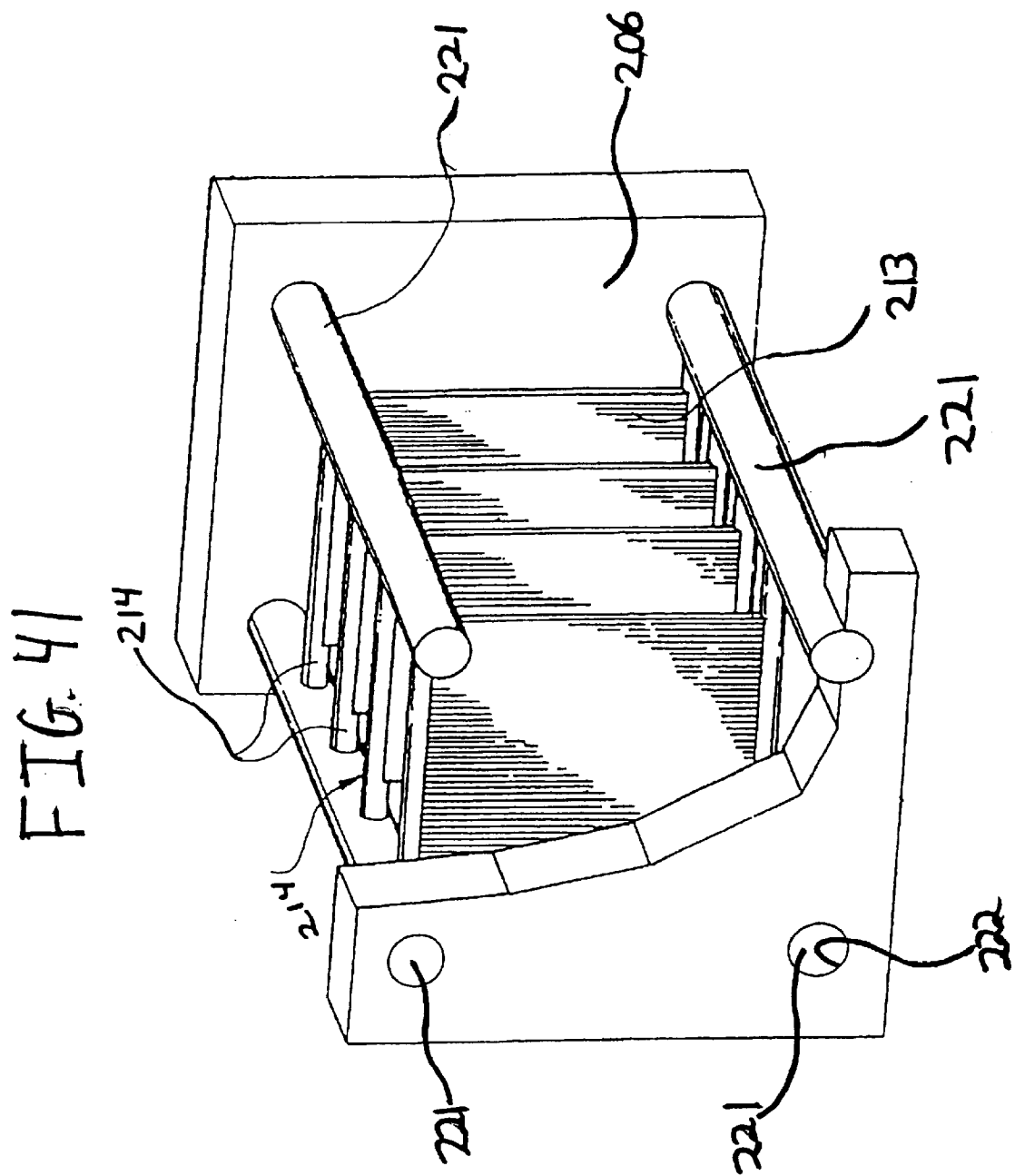

FIG. 41 shows a modified version of FIG. 40, in which the membrane fixing members 214 are arranged horizontally, instead of vertically as in FIG. 40.

Figure 42:
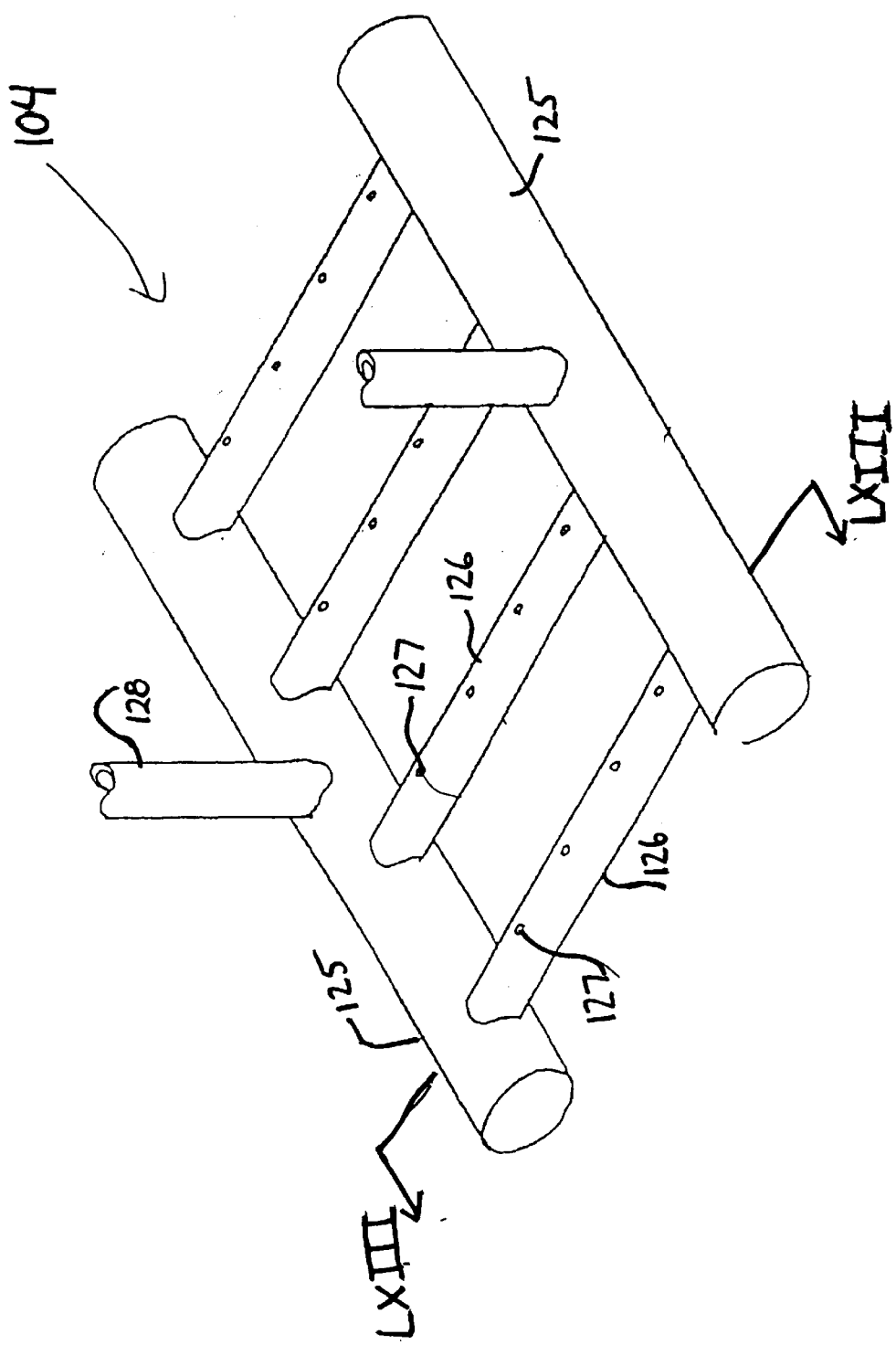
FIG. 42 is a perspective view of a gas diffuser suitable for use in the present invention.

The gas diffuser 104 is illustrated in isolation in FIG. 42. The gas diffuser 104 is constructed and arranged to guide air from a blower across the interior of the aeration vessel 101a. The gas diffuser 104 includes opposing main pipes 125 with a plurality of branch pipes 126 extending perpendicularly between the main pipes 125. The main pipes 125 and branch pipes 126 are in fluid operation with each other so that, during operation, gas, such as air, received in the main pipes 125 (via pipes 228) is transported from the main pipes 125 to the branch pipes 126 and expelled from gas discharged ports 127 into the vessel 101a.

Figure 43:
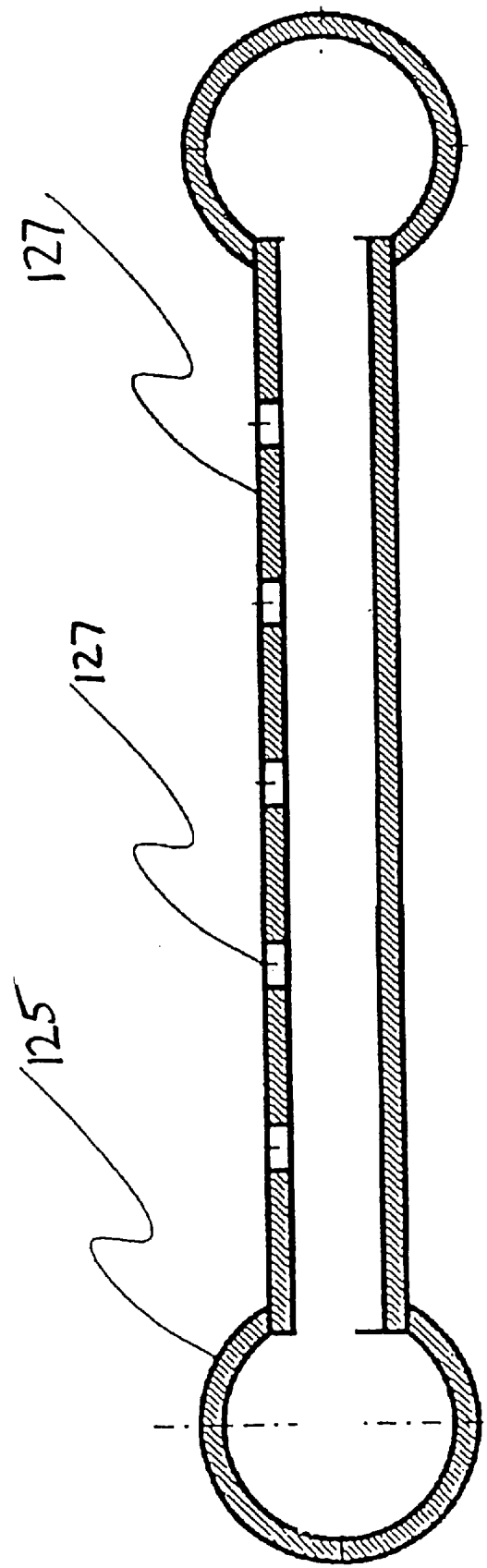
FIG. 43 is a sectional view of a main pipe of the gas diffuser of FIG. 42, taken along sectional line LXIII—LXIII of FIG. 42.

As shown in FIG. 43, the cross-sectional area A2 of the inner surfaces of the main pipes 125 is preferably larger than the cross-sectional area A1 of the inner surfaces of the branch pipes 126. As referred to herein, A1, A2 mean the cross-sections taken along a direction perpendicular to the axes of the pipes 125 and 126. A1 and A2 are preferably selected so that a ratio of A2:A1 is in the range $20 \geqq A2/A1 \geqq 2$ in order to minimize the likelihood of the branch pipes 126 being shattered by pressure differences. As a result of equalizing pressure, it is possible to prevent sludge from entering, and thereby blocking the gas discharge ports 127.

Figure 44:
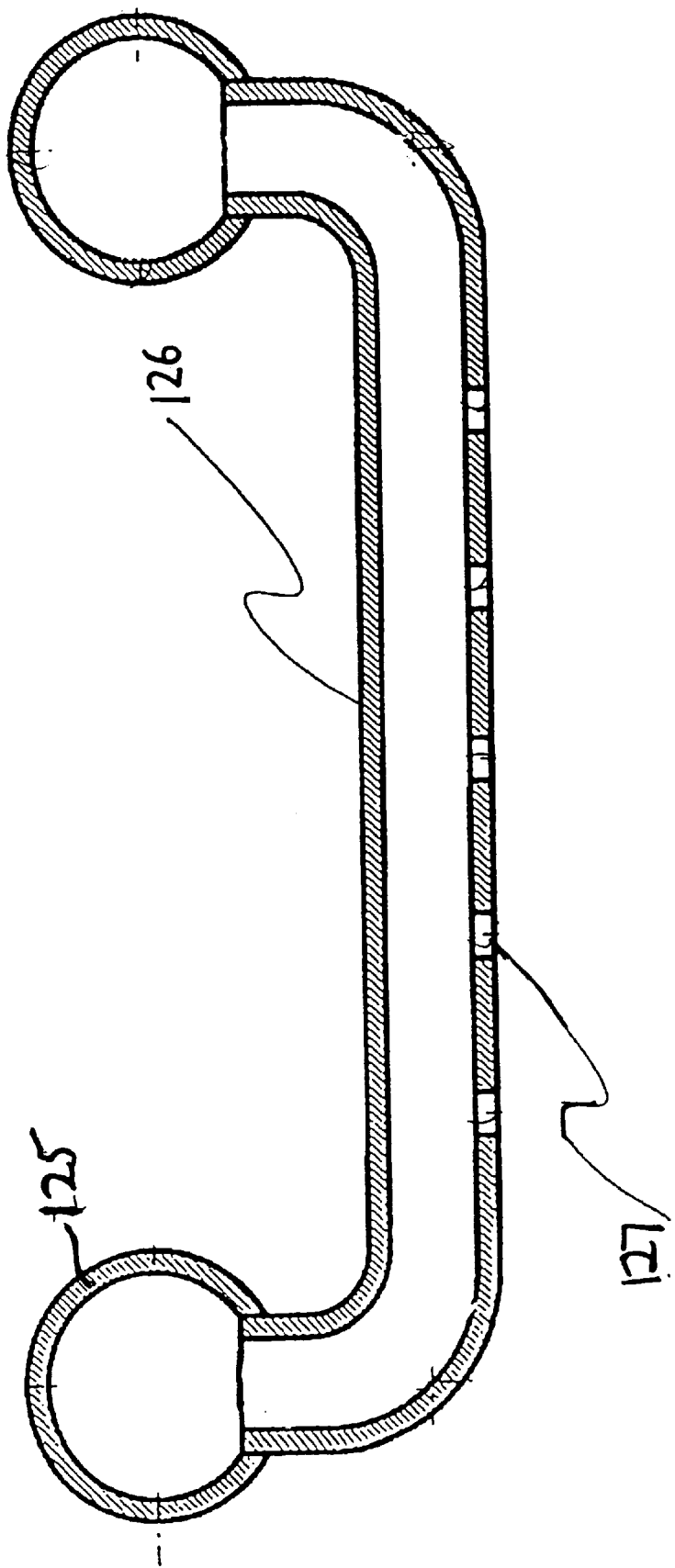
FIG. 44 is a variation to the sectional view shown in FIG. 43.

It is to be understood that the gas diffuser 104 shown in FIGS. 42 and 43 is not the exclusive gas diffuser which can be used with this invention. For example, as shown in FIG. 44, the gas discharge ports 127 can be provided in the lowermost portions of the branch pipes 126 to further reduce the likelihood of sludge blocking the ports 127 and/or entering branch pipes 126. As shown in FIG. 45, the gas discharge ports 127 can include flow conduit members 129 extending therethrough. The flow conduit members 129 can be made of the same material as the branch pipes 126. The flow conduit members 129 are preferably cylindrical (as shown) in order to enhance processability; however, other shapes, such as tubes having polygonal, elliptical, or random cross sections can be used. Any suitable joining technique, such as bonding and/or welding, can be used to join the flow conduit members 129 to the branch pipes 126.

Figure 47A:
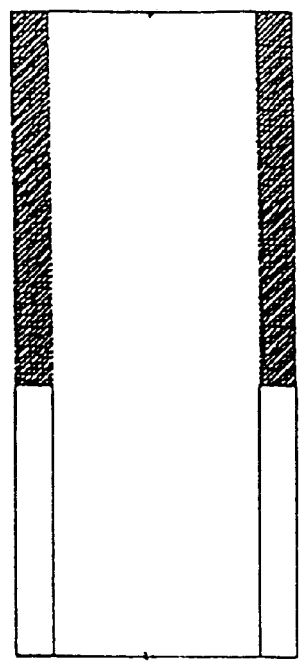
Figure 47B:
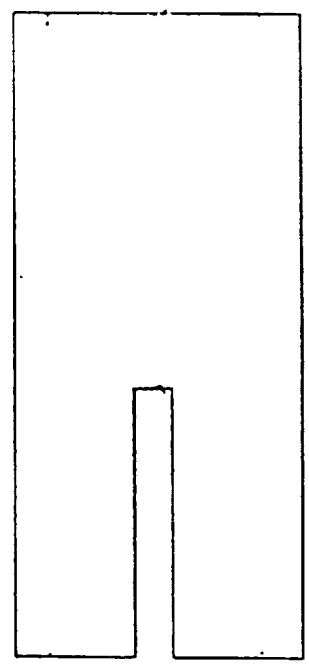
Figure 48A:
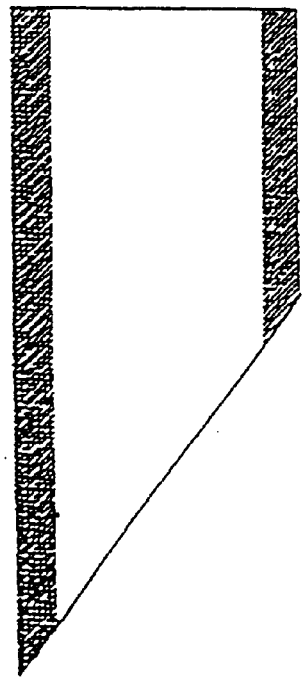
Figure 48B:
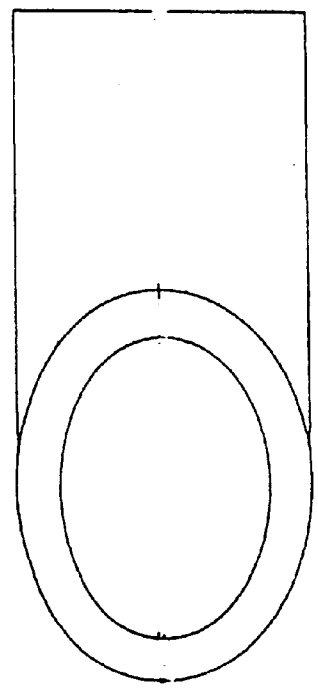

As referred to herein, cross-sectional area of the openings for the flow conduit members 129 means the area of a flat-surfaced sheet covering the opening when the sheet is stretched onto the inner edge defining the opening when the curved edges are positioned on the same plane. Suitable openings include circular side openings (FIGS. 46A and 46B), slits (FIGS. 47A and 47B), and diagonal openings (FIGS. 48A and 48B). The arrangement and size of the openings can be designed to achieve such objects as decreasing the velocity of flow of the discharge air at the inner openings, preventing the air accompanied by dried sludge from entering the gas diffusion pipes, minimizing the possibility of blockage of the gas discharge openings due to dried sludge, and preventing the gas discharge openings from being blocked up for a long period of time.

According to one preferred embodiment, the flow conduit members 129 have one or more openings positioned outside of the ports 127 of the branch pipes 126 and one or more openings positioned inside of the ports 127 of the branch pipes 126. The openings positioned outside of the branch pipes 126 preferably collectively have a cross-sectional area $A_{out}$ that is less than a collective cross-sectional area $A_{in}$ of the openings positioned inside of the branch pipes 126.

Figure 49:
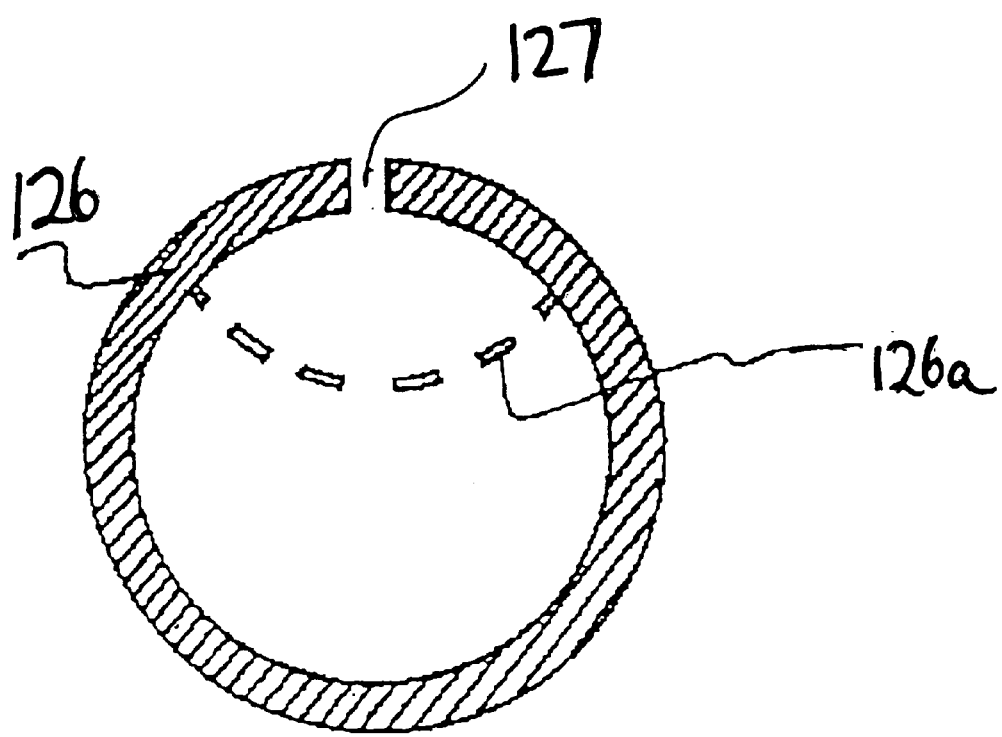
FIG. 49 is a sectional view of a diffusion pipe.
Figure 50:
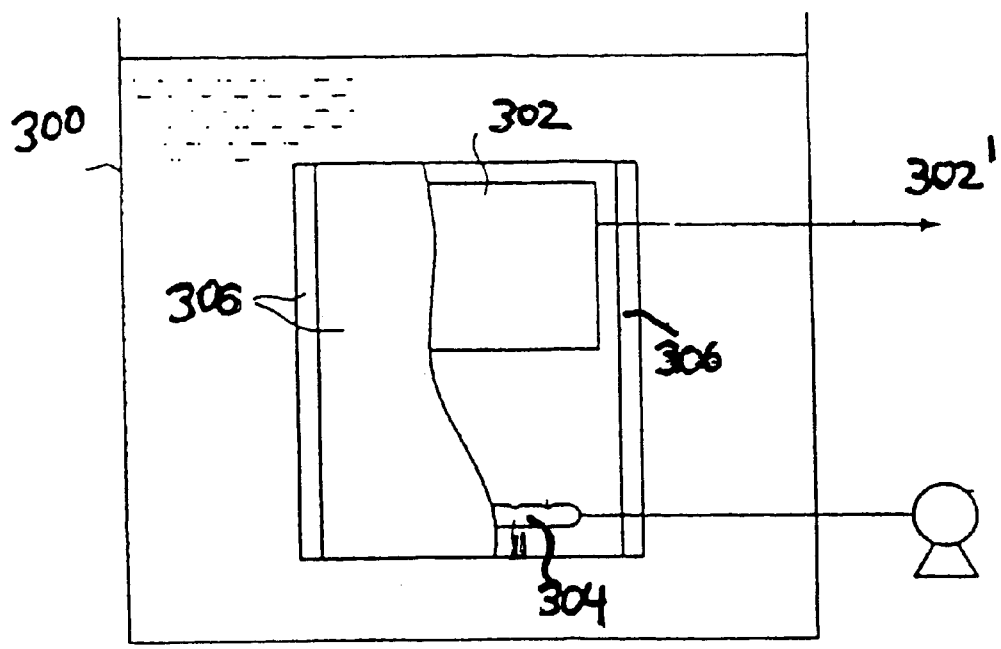
FIG. 50 is a partial sectional view of a liquid-solid separating membrane assembly installed in a treatment vessel in accordance with a third embodiment of this invention.
Figure 51:
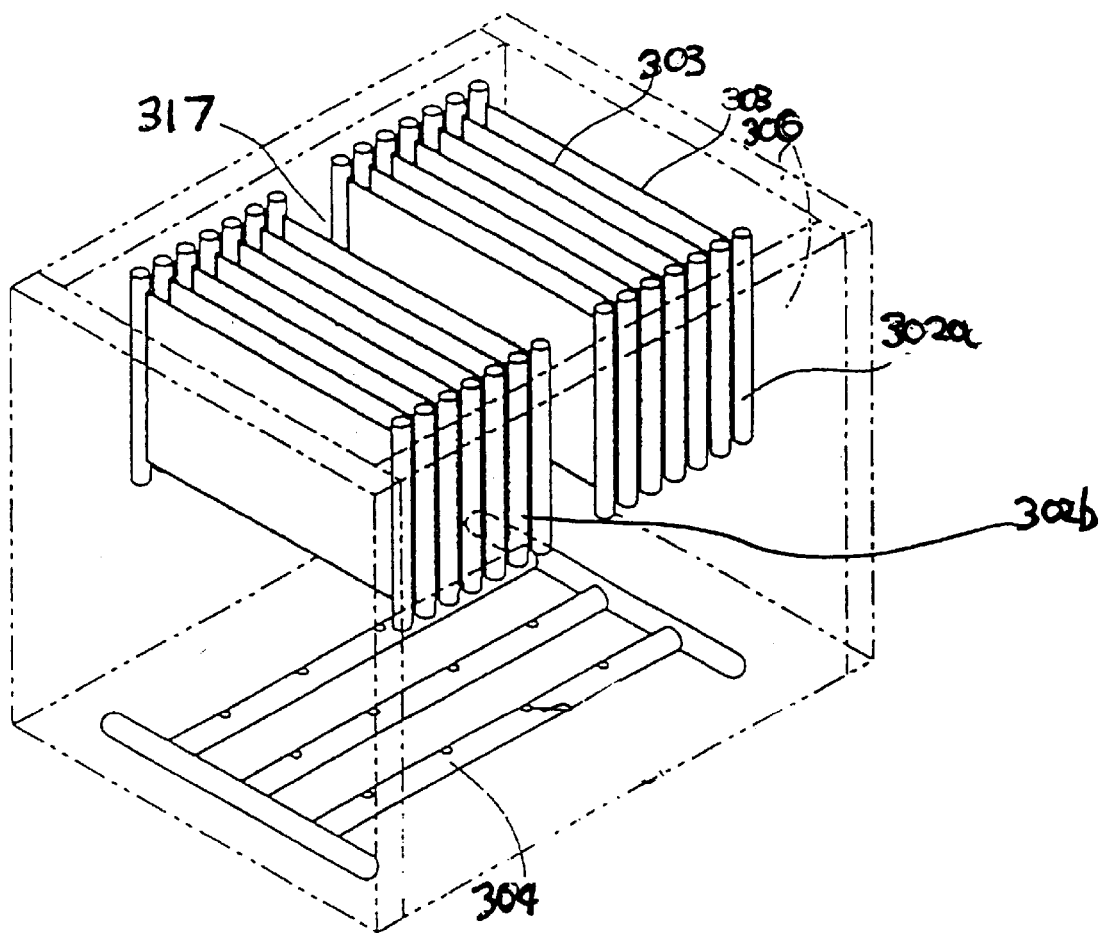
FIG. 51 is a perspective, partially sectional view of the assembly of FIG. 50, depicting opposing enclosure wall structures, a diffuser, and membrane module units each comprising a plurality of membrane modules of the assembly.

FIG. 49 shows one of the branch pipes 126 having a cover 126a disposed within the branch pipe 126, and more particularly around a portion of the pipe 126 defining a corresponding gas discharge port 127. The covers 126a assist in preventing dried sludge or the like from blocking associated gas discharge ports 127 or entering the branch pipe 126. The cover 126a includes holes, slits, or other types of perforations designed to permit the passage of gas. By way of example, a metallic net can be used as the cover 126a. The diameter or width of the holes of the cover 126a is preferably from about 0.3 mm to about 3 mm in view of the diameter of the gas discharge ports 127 and the size of the dried sludge desired to be trapped. Cover hole diameters less than 0.3 mm are not preferable because a pressure loss of the gas passing therethrough increases. On the other hand, it is preferred that the cover hole diameters not be larger than 3 mm to prevent dried sludge from passing through and blocking the ports 127. The collective cross-sectional area Ain of the openings of the cover 126a is preferably larger than the cross-sectional area Aout of the gas discharge opening to be covered. More preferably, the ratio of Ain/Aout is more than 1.2 and less than 10. When the ratio is less than 1.2, the ports 127 tend to be blocked. Setting this ratio to higher than 10 results in a cover 126a of such large size that the cover 126a can obstruct the flow of air.

The through hole covers 126a can be made of the same or a different material as the branch pipe 126a, although the materials are preferably the same in order to promote securing of the covers 126a to the branch pipe 126.

An example of still another embodiment of the present invention will now be described in connection with FIGS. 50–54, which shows another liquid-solid separating membrane assembly 320.

Figure 25:
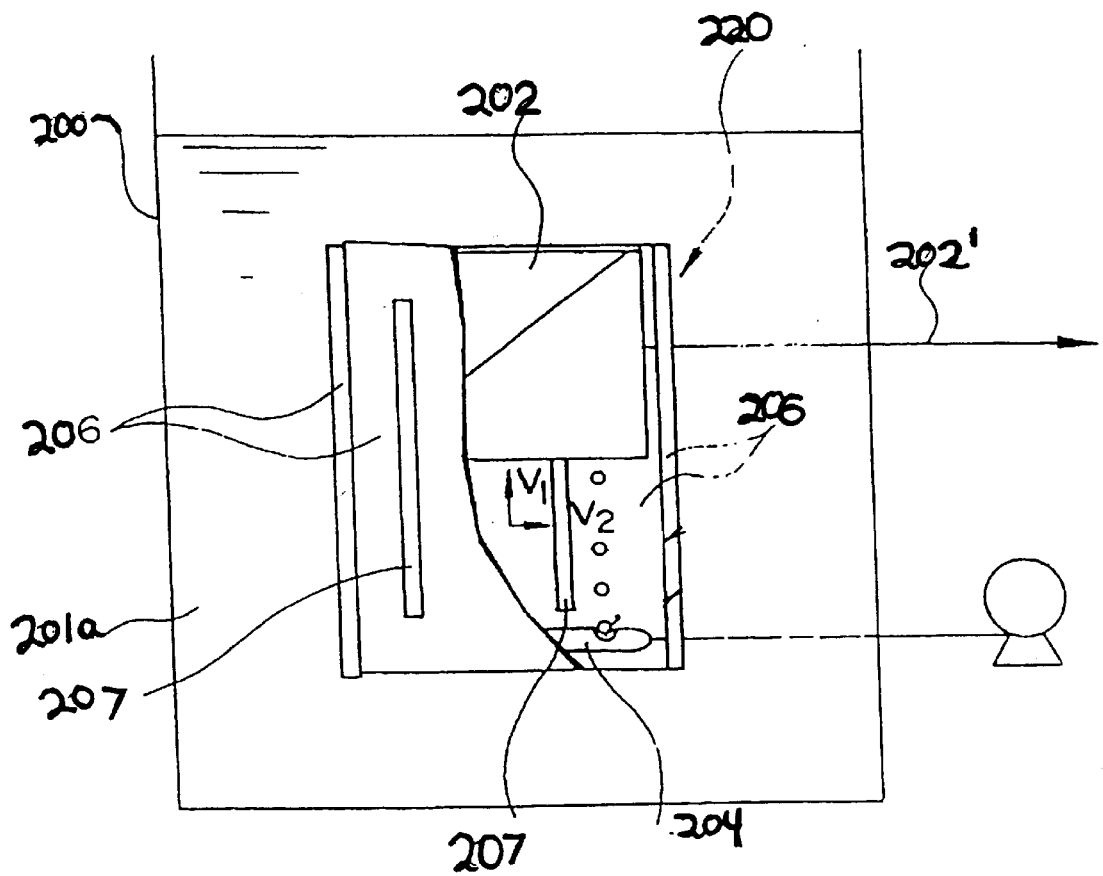
FIG. 25 is a partial sectional view of a liquid-solid separating assembly installed in a treatment vessel in accordance with a second embodiment of this invention.
Figure 26:
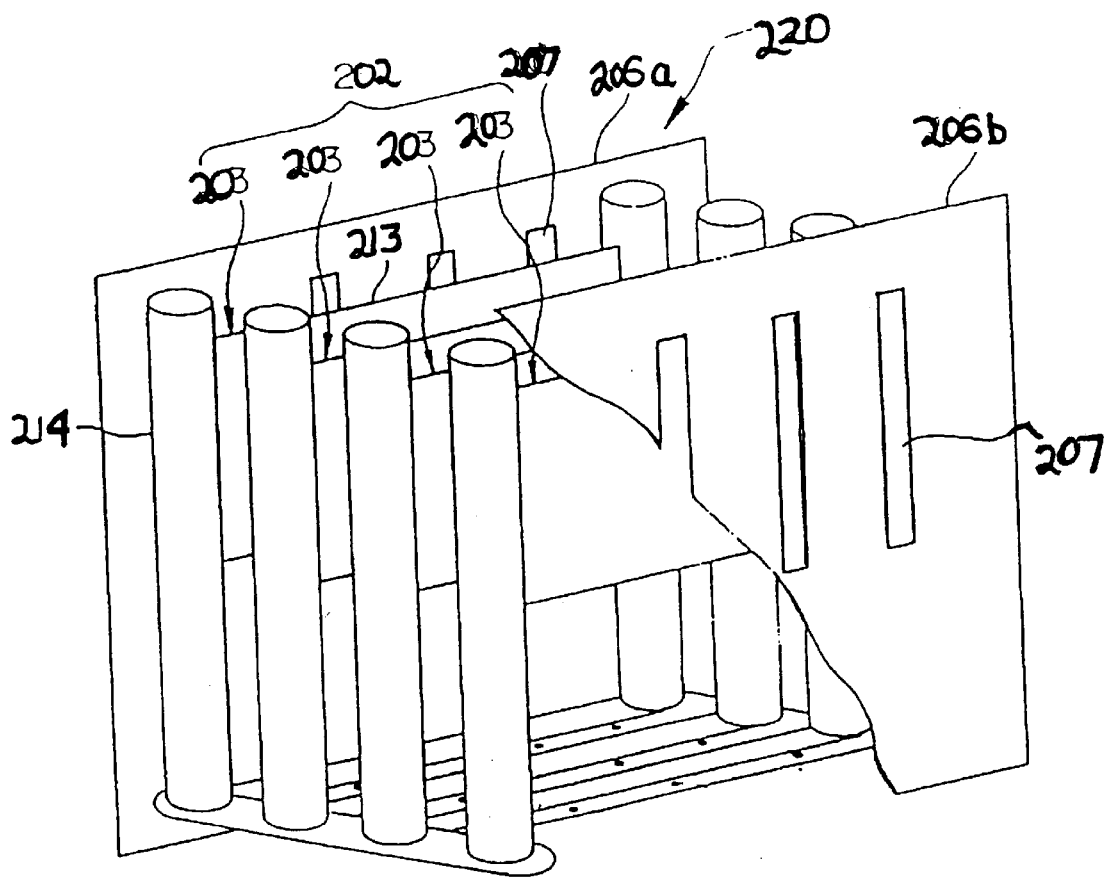
FIG. 26 is a perspective, partially sectional view of the assembly of FIG. 25, depicting opposing enclosure wall structures, a diffuser, and a membrane module unit comprising a plurality of membrane modules of the membrane separator assembly.

The basic construction of assembly 320 is identical to that of the assembly 120 shown in FIG. 1 and assembly 220 shown in FIG. 25. Unlike assemblies 120 and 220, however, the assembly 320 depicted in FIGS. 50–54 includes a membrane module unit 302 divided into separate sets of membrane modules 303. (For the purposes of this discussion, unit 302 is designated as having separated sets 302a and 302b of modules. It is understood, however, the sets 302a and 302b can be separate membrane module units with an enlarged clearance 317 therebetween.) The filtration system of the assembly 320 includes the same parts, e.g., water collecting pipe 302' and pumps, and operates in substantially the same manner as discussed above in connection with FIG. 1.

The assembly 320 generally comprises a treatment vessel 300 filled with an object liquid, a membrane module unit 302 provided in the interior of the treatment vessel 300, a gas diffuser 304 provided below the membrane module unit 302, and four enclosure wall structures 306 provided so as to be opposed to the front, rear, and left and right side surfaces of and surround the membrane module unit 302 and the gas diffuser 304. The membrane module unit 302 is divided into two sets 302a and 302b of substantially quadrangular flat-type membrane modules 303, which are arranged parallel to one another so as to provide each of the sets 302a and 302b with a substantially parallelopipedal external appearance. The membrane module unit 302 is disposed so that the membrane surfaces of the flat-type membrane modules 303 are perpendicular to a bottom surface of the treatment vessel 300. Although the above-mentioned various modes of modules can be used, the hollow yarn membrane modules shown in FIG. 4 are preferably used as modules 303.

Figure 52:
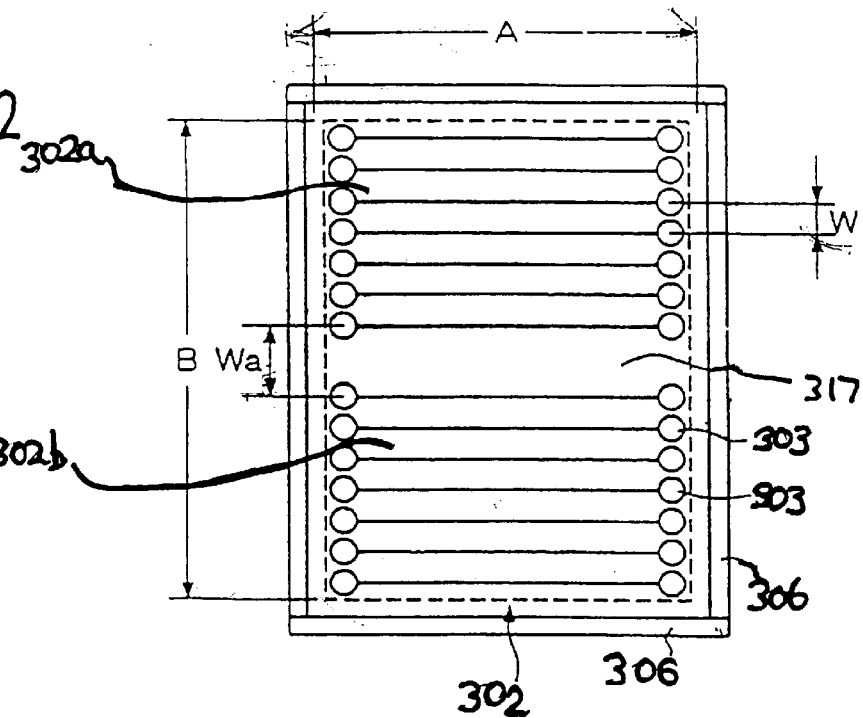
FIG. 52 is a plan view of the assembly of FIG. 51.
Figure 53:
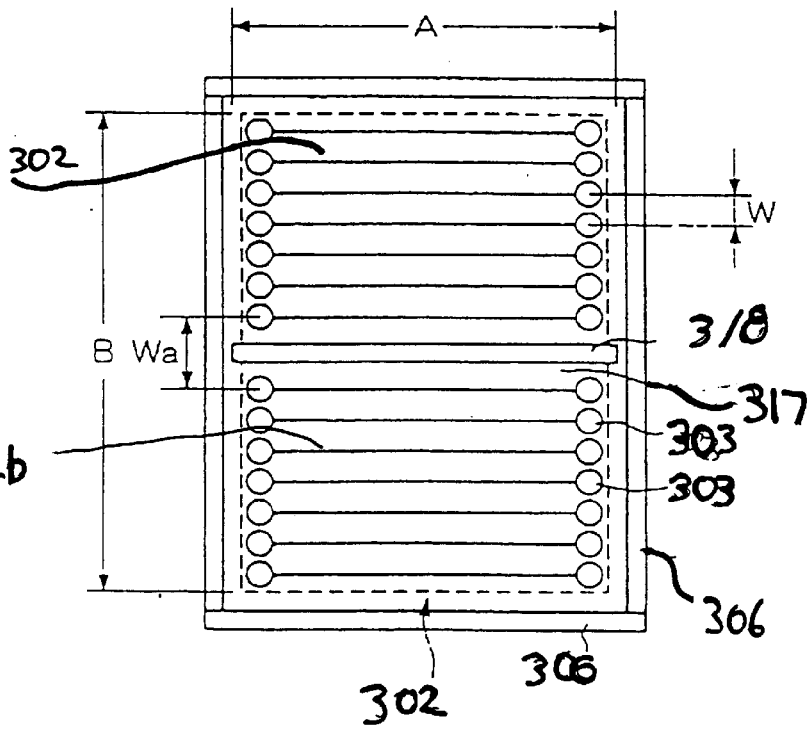
FIG. 53 is a plan view similar to FIG. 53, but showing a partition plate.

As shown in FIGS. 52 and 53, the membrane modules 303 are spaced from each other at uniform and repeating intervals W, with the exception of clearance 317 between adjacent sets 302a and 302b, which have outermost yet facing modules with respective lateral axes that are spaced from each other by Wa. Referring to FIGS. 52 and 53, A is equal to the length of a side of the membrane separation unit 302 which is parallel to modules 303, and B is equal to the overall length of the side of the unit 302 which is perpendicular to the modules 303.

Figure 54:
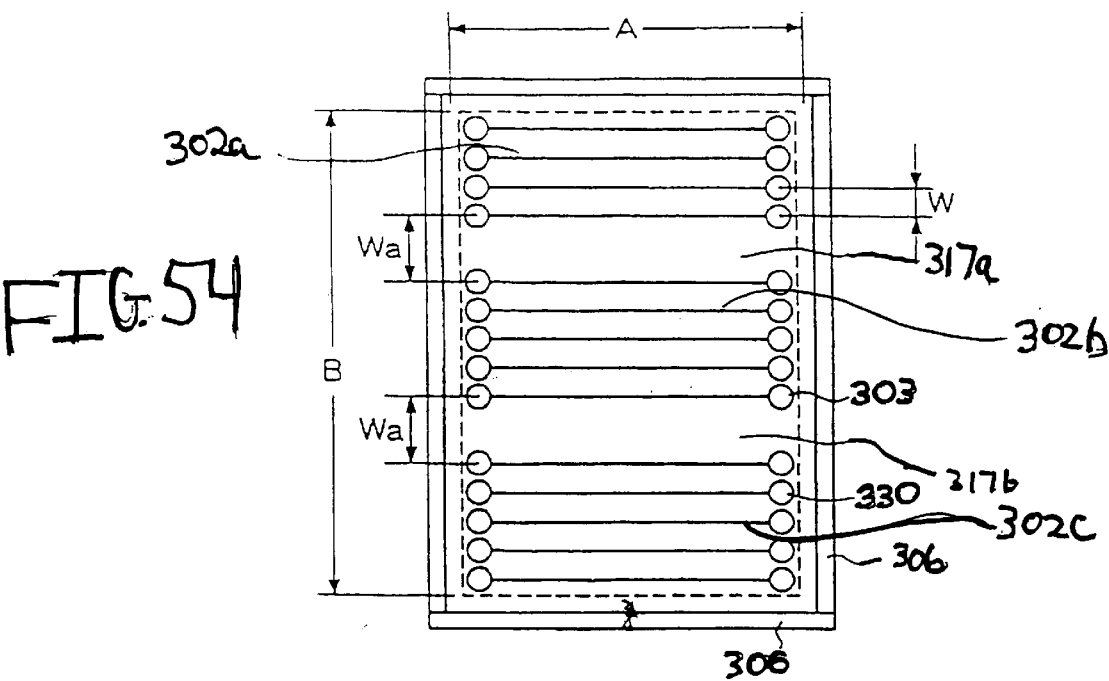
FIG. 54 is a plan view similar to FIG. 52, but showing a different arrangement of membrane module units.

The total area of the membrane module unit 302, as determined by the lengths A and B, and W are not specially limited, but are determined based on the intended application. In preferred examples, however, A is in a range of from about 30 cm to about 1 m, and W is about 1 to about 3 times the width of the membrane fixing members. The frequency of clearances 317 is determined based on such factors as the intended application and lengths A and B. For example, FIG. 54 shows two clearances 317a and 317b located between sets 302a, 302b and 302b, 302c, respectively, of the membrane separating unit.

Preferably, it is preferred that the sets of the membrane separating unit 302a and 302b have lengths (from outermost membrane modules) of 0.2 to 2 times, more preferably 0.4 to 1.5 times, the length A. When the length of the unit sets 302a and 302b is more than 2 times the length of A, cleaning efficiency is adversely affected. On the other hand, when the length of the unit sets 302a and 302b is less than 0.2 times the length of A, the integration efficiency of the membrane modules 303 decreases significantly.

Wa is preferably not more than 5 times the length W, and preferably is not more than 4 times the length W, in order to maintain a high integration efficiency. Wa is preferably not less than 1.2 times the length W, and more preferably not less than 1.5 times the length W, in order to maintain a satisfactory cleaning efficiency.

As shown in FIG. 53, a partition plate 318 can optionally be provided in the clearance 317. The partition plate 318 serves to restricts the direction of movement of the gas-liquid mixed flow, and improves the cleaning performance achieved by the diffuser 304. The partition plate 318 is normally centered in the clearance 317 so as to be parallel to and half way between facing membrane modules 303 of adjacent unit sets 302a and 302b. Although the material for the partition plate 317 is not specially limited, for example, a resin, a metal and a ceramic material can be used. The partition plate 317 is depicted as a flat plate, although other shapes can be used. The width of the partition plate 317 is selected suitably in accordance with the clearance size Wa, and preferably is from about 1 mm to about 10 mm. The partition plate 317 can have an area substantially equal to that of the surface area of the membrane modules 303.

As mentioned above, more than one clearance 317 can be provided. For example, FIG. 54 illustrates two clearances 317a and 317b. The size Wa of each of the clearances are illustrated as being equal, although it certainly falls within the scope of the invention to vary the size of Wa so as to differ between 317a and 317b.

As shown in the embodiment depicted in FIGS. 52–54, as well as the other embodiments described above, the end portions of the membrane modules 303 of a given unit 302 are disposed in linear relation, so that the membrane modules 303 of a given unit 302 collectively define a rectangle when viewed from above. It is understood, however, that the membrane modules 303 may be placed in other arrangements. For example, the end portions of the membrane modules 303 can be arranged in a diagonally staggered manner to define a parallelopiped. When the end portions are disposed in a staggered manner, the value of A (for the purposes of determining Wa) is the length of the top surface of a parallelopiped of a minimum volume enclosing the membrane separating unit 302.

The embodiment of FIGS. 52–54 comprises four enclosure wall structures 306a, 306b, 306c, and 306d arranged parallel with corresponding side surfaces of the membrane module unit 302 so as to surround the membrane module unit 302 and the gas diffuser 304. Because the unit 302 and the gas diffuser 304 is surrounded by the enclosure wall structures 306a–306d, the gas-liquid mixed flow generated by the diffuser 304 remains in proximity to the unit 302 to promote uniform cleaning by uniform distribution of the gas-liquid mixed flow. It is to be understood, however, that only two side surfaces located on opposite sides of the unit 302 can be used.

The distance between, on the one hand, the membrane separating unit 302 and/or the gas diffuser 304 and, on the other hand, the enclosure wall structures 306 is usually set to from about 10 mm to about 200 mm. Although the material for the enclosure wall structures 306 is not specially limited, suitable materials include, for example, resins, metals and ceramic materials. The enclosure wall structures 306 may comprise, by way of example, flat plates or corrugated plates, as long as the enclosure wall structures 306 enclose the membrane module unit 302 and the gas diffuser 304.

According to the present invention, a suitable size of clearance 317 is provided between adjacent sets of membrane modules 303. Therefore, the gas-liquid mixed flow generated by the gas diffuser 304 rapidly moves up between the membrane modules 303, and the membrane modules 303 are efficiently scrubbed, whereby the filtration operation progresses with the absorption of solid matter to the membrane surfaces being minimized. Since the cleaning effect due to the air scrubbing of the membrane surfaces is thus improved, the solid-liquid separation can be carried out at a high flow rate by preventing solid matter from clogging of the membrane surfaces. This enables a reduction in maintenance frequency, thereby reducing interruptions to the filtration operation. The arrangement of the enclosure wall structures 306 partition plate 318 in parallel relation to the membrane modules 303 further improves the uniformity and efficiency of cleaning.

The cleaning effect, oxygen dissolution rate in a biological treatment, and economical efficiency can be controlled by adjusting the discharge rate of the gas from the gas diffuser 304 and average moving velocity of the gas-liquid mixed flow in the vertical direction during a filtration control operation.

During use, the separating membranes are cleaned with a solution comprising a detergent. The detergent preferably comprises a percarbonate-containing material, such as peroxocarbonate, which includes peroxomonocarbonate and peroxodicarbonate. The percarbonate exists in the condition in which hydrogen peroxide is adducted in carbonate. The percarbonate in use is desirably an alkali metal salt or alkali earth metal salt, such as sodium salt, potassium salt, lithium salt, calcium salt, magnesium salt and beryllium salt, with sodium percarbonate ($Na_2CO_3 \cdot 1.5H_2O_2$) being preferred. The percarbonate preferably constitutes from 0.1 wt % to 10 wt % of the solution, and more preferably 1 wt % to 5 wt % of the solution.

When the percarbonate is dissolves into the water, the organisms deposited on the membrane surfaces are decomposed due to the hydrogen peroxide component, so that clogging of the membrane is prevented. Additionally, the detergent of this invention does not generate noxious substances, making it environmentally desirable.

The detergent preferably further comprises at least one bivalent iron salt, which improves the cleaning capability of the percarbonate via the so-called Fenton's reaction in which hydrogen peroxide adducted in the percarbonate reacts with the bivalent iron ions to form $OH^-$ radicals.

$$H_2O_2 + Fe^{2+} \cdot OH + OH^- + Fe^{3+}$$

The $OH^-$ radicals have a very high oxidation reactivity, such as hydrogen extraction reactivity with respect to organisms, and promote the oxidation decomposition of organisms. The bivalent iron salt used in this detergent may be supplied as any kind of salt, including, for example, in the form of a chloride, sulfate, or nitrate. The content of bivalent iron ions in the cleaning solution according to the present invention preferably is in the range of $1 \times 10^{-9}$ to $1 \times 10^{-1}$ (mol/l), and more preferably in the range of $1 \times 10^{-7}$ to $1 \times 10^{-1}$ (mol/l).

The detergent according to the present invention may optionally also contain at least one of an oxidizer other than hypochlorite and hydrogen peroxide, a surfactant, a chelating agent, and acid and a pH regulator. A representative surfactant is dodecyl sodium sulfonate. A representative class of pH regulators are phosphate regulators.

In order to use the detergent comprising the above-mentioned composition for separating membranes according to the present invention, it is dissolved completely in water.

In the cleaning method according to the present invention, a system for bringing separating membranes to be cleaned and detergent into contact with each other is not specially limited as long as it enables the separating membranes and detergent to contact each other sufficiently. An immersion system or a liquid passing system is preferable. An immersion system involves placing the inner and outer portions of the separating membranes completely under the surface of a solution comprising the detergent. The liquid passing system involves passing a cleaning solution through the separating membranes in the same manner as in a regular separation operation. When the cleaning solution and separating membranes are brought into contact with each other, physical cleaning methods, such as a scrubbing method with bubbles and a cleaning method using ultrasonic waves may further be combined with the above-mentioned method.

Ascertaining operation conditions, such as, for example, temperature and time, for accomplishing a suitable cleaning effect while preventing undue amounts of membrane clogging is within the purview of a skilled artisan having reference to this disclosure and may be based on such factors as the nature of solid substances in the object liquid and the concentration of percarbonate and other ingredients in the detergent.

Priority is based on the following Japanese Patent Applications: Application No.228394/1998 filed on Aug. 12, 1998; Application No. 228921/1998 filed on Aug. 13, 1998; Application No. 257209/1998 filed on Sep. 10, 1998; Application No.257210/1998 filed on Sep. 10, 1998; Application No.277913/1998 filed on Sep. 30, 1998; Application No. 287068/1998 filed on Oct. 8, 1998; and Application No. 298838/1998 filed on Oct. 20, 1998. The complete disclosures of each of these Japanese Patent Applications are incorporated herein by reference.

The principles of this invention will not be further elucidated upon with reference to the following examples, which are not intended to be exhaustive or exclusive of the scope of this invention.

EXAMPLES

Example 1

Five hollow yarn membrane modules (Commercial name: Sterapore L manufactured by the Mitsubishi Rayon Co., Ltd.) constructed in the manner shown in FIG. 4 were provided. Each of the modules comprised a hollow polyethylene yarn membrane with average pore diameters of 0.1 $\mu$m. The membranes were developed and fixed in the shape a screen between opposing membrane fixing members containing passages, so that the membrane fixing members also served as wall collecting members. A distance between centers of adjacent modules was 6 cm. A gas diffuser was provided below the membrane modules so as to be spaced from lower end portions of the membrane modules by 45 cm. First and second resin plate-like opposing enclosure wall structures (100 cm in height, 85 cm in width, and 1 cm in thickness) and third and fourth resin plate-like opposing resin plate-like enclosure wall structures (100 cm in height, 35 cm in width, and 1 cm in thickness) were placed in contact with one another and arranged to enclose the membrane modules.

The gas diffuser comprising five vinyl chloride pipes of 3 cm in outer diameter, 0.3 cm in wall thickness and 30 cm in length was used, with the five vinyl chloride pipes being spaced at intervals (between axes) of 18 cm. Four gas discharge holes of 0.3 cm were formed at intervals of 7 cm in a top wall portion of each of these pipes. Both ends of each pipe were joined to vinyl chloride pipes of the same diameter having a length of 80 cm, thereby forming a rectangular structure.

Gas was diffused by using a blower under the condition that an intensity of diffusion of the gas was set to 75 $m^3/m^2/hr$ per horizontal cross-sectional area of the membrane separator. In each of the examples provided herein, the gas was air.

Active sludge having a MLSS concentration of 8000 to 12000 mg/L was subjected to a one-year continuous filtration treatment using a suction pump under the conditions including a membrane permeation velocity of flow of LV=0.01 $m^3/m^2hr$ with the membrane separator operated intermittently so that 13-minute filtration and 2-minute interruption alternated.

Example 2

A filtration treatment was carried out by using the same hollow yarn membrane modules as those in Example 1 and changing the following conditions only. The gas diffuser had five vinyl chloride branch pipes of 3 cm in outer diameter and 0.3 cm in wall thickness. The branch pipes were bent at both end portions thereof at an angle of about 90, and were arranged at intervals of 18 cm. Both ends of each of the branch pipes were joined to lowermost portions of main pipes formed of vinyl chloride pipes having an outer diameter of 5 cm, a wall thickness of 0.4 cm, and a length of 80 cm. The length of horizontal portions of the branch pipes was 30 cm, and the length of vertical portions of the branch pipes were 5 cm. In the bottom of the horizontal portions of the branch pipes were formed four gas discharge ports of 3 cm diameter; the gas discharge ports were spaced at 7 cm intervals.

A gas was diffused in the same manner as in Example 1 by using a blower under the condition that the gas diffusion intensity was set to 75 $m^3/m^2/hr$ per cross-sectional area of the membrane separator. A filtration treatment was also conducted under the exact same conditions as in Example 1.

Example 3

A filtration treatment was conducted by using the same hollow yarn membrane modules as those in Example 1 and changing the following conditions only. Vinyl chloride tubular members having an outer diameter of 0.5 cm, an inner diameter of 0.3 cm, and a length of 2 cm were fitted into the gas discharge holes of the branch pipes of the same diffuser as in Example 2. Two lateral holes having diameters of 0.3 cm were provided in the portions of the tubular members positioned in the interior of the branch pipes.

A gas was diffused in the same manner as in Example 1 by using a blower under the condition that gas diffusion intensity was set to 75 $m^3/m^2/hr$ per horizontal cross-sectional area of the membrane separator. A filtration treatment was also conducted under the exact same conditions as in Example 1.

Example 4

A filtration treatment was conducted by using the same hollow yarn membrane modules as those in Example 1 and changing the following conditions only. Two resin plates having a height of 50 cm, a width of 85 cm, and a thickness of 1 cm were arranged on the outer sides of the membrane modules so that the resin plates extended parallel to the membrane surfaces. The gas diffuser provided was spaced below the membrane modules by a clearance of 45 cm. The periphery of the gas diffuser was enclosed with two resin plates having heights of 50 cm, widths of 85 cm, and thicknesses of 1 cm and two resin plates having heights of 50 cm in height, widths of 35 cm, and thicknesses of 1 cm.

Each membrane fixing member had a width (when viewed from the side) of 5 cm and a length of 45 cm. The membrane fixing members were arranged so that the percentage of the total area of the membrane fixing members with respect to an area of a rectangle roughly defined by the membrane module unit was 86.2%.

A gas diffuser identical with that used in Example 2 was used. A gas was diffused in the same manner as in Example 1 by using a blower under the condition that the gas diffusion intensity was set to 75 $m^3/m^2/hr$ per horizontal cross-sectional area of the membrane separator. A filtration treatment was also conducted under the exact same conditions as in Example 1.

Example 5

A filtration treatment was conducted by using the same hollow yarn membrane modules as those in Example 1 and changing the following conditions only. Five membrane modules were arranged laterally so that a distance between the centers of adjacent membrane modules was 10 cm. The percentage of the side surface area of all of the membrane fixing members with respect to the side surface area of the membrane module unit was 55.6%. Two resin plates each having a height of 50 cm, a width of 85 cm, and a thickness 1 cm were arranged on outer sides of the membrane modules so that the membrane modules were interposed therebetween. A gas diffuser was provided under the membrane modules and spaced from lower end portions of the membrane modules by 45 cm. The periphery of the gas diffuser was enclosed with two opposing resin plates having a height of 50 cm, a width of 85 cm, and a thickness of 1 cm and two additional opposing resin plates having a height of 50 cm, a width of 50 cm, and a thickness of 1 cm.

The gas diffuser was formed in the same manner as in Example 4, except that a length of horizontal portions of the branch pipes was set to 40 cm with 6 gas discharge holes provided therein at intervals of 7 cm. Gas was diffused in the same manner as in Example 1 by using a blower under the condition that the gas diffusion intensity was set to 75 $m^3/m^2/hr$ per a horizontal cross-sectional area of the membrane separator. A filtration treatment was also conducted under the exact same conditions as in Example 1.

Example 6

A filtration treatment was conducted by using the same hollow yarn membrane modules as those in Example 1 and changing the following conditions only. The enclosure wall structures were arranged in the same manner as in Example 1, except that the enclosure wall structures collectively had 18 vertically extending slit-type passages. The passages extended 90 cm in height and 1 cm in width, with the slits being laterally spaced from each other by 10 cm intervals. Seven of the passages were formed in each of the longer enclosure wall structures, and two of the passages were formed in each of the shorter length enclosure wall structures (thereby providing the 18 passages). Collectively, the slit-type passages constituted 6.75% of the surface area of the enclosure wall structures.

A gas diffuser identical with that used in Example 2 was used. A gas was diffused in the same manner as in Example 1 by using a blower under the condition that the gas diffusion intensity was set to 75 $m^3/m^2/hr$ per horizontal cross-sectional area of the membrane separator. A filtration treatment was also conducted under the exact same conditions as in Example 1.

Example 7

A filtration treatment was conducted by using the same hollow yarn membrane modules as those in Example 1 and changing the following conditions only. The enclosure wall structures were arranged in the same manner as in Example 1. However, the enclosure wall structures were collectively provided with a total of 40 slit-type passages, each having a length of 95 cm and a width of 3 cm, with adjacent passages being spaced laterally from each other by 2 cm intervals. Each of the longer length enclosure wall structures had fifteen of the passages, whereas each of the shorter length enclosure wall structures had five of the passages (thereby totaling 40 passages). Collectively, the slit-type passages constituted 47.5% of the surface area of the enclosure wall structures.

A gas diffuser identical with that used in Example 2 was used. A gas was diffused in the same manner as in Example 1 by using a blower under the condition that the gas diffusion intensity was set to 75 $m^3/m^2/hr$ per horizontal cross-sectional area of the membrane separator. A filtration treatment was also conducted under the exact same conditions as in Example 1.

Example 8

A total of eighteen hollow yarn membrane modules identical to those in Example 1 were arranged as follows. A first set of six of the hollow yarn membrane modules were arranged laterally, with the membranes and water collecting members being vertical. A clearance of 12 cm in width was provided adjacently to a forward end module. A second set of six of the hollow yarn membrane modules were subsequently arranged in the same manner, with a first clearance of 6 cm between the first and second sets of hollow yarn membrane modules. A third set of six of the hollow yarn membrane modules were then arranged in the same manner, with a second clearance of 6 cm between the second and third sets of hollow yarn modules.

The gas diffuser was spaced 45 cm under the lower end portions of the membrane modules. The periphery of the membrane modules and the diffuser were enclosed with four resin plate-type enclosure wall structures. A first set of opposing enclosure wall structures each had a height of 100 cm, a width of 85 cm, and a thickness of 1 cm. A second set of opposing enclosure wall structures had a height of 100 cm, a width of 135 cm, and a thickness of 1 cm. Partition plates having heights of 100 cm, widths of 85 cm, and thicknesses of 1 cm were provided in the first and second clearances. This arrangement met all the clearance-providing conditions of the present invention.

The gas diffuser was formed in the same manner as that in Example 2 except that a length of horizontal portions of the branch pipes was 125 cm, with 15 gas discharge holes provided therein at intervals of 7 cm. Gas was diffused in the same manner as in Example 1 by using a blower under the condition that the gas diffusion intensity was set to 75 $m^3/m^2/hr$ per horizontal cross-sectional area of the membrane separator. A filtration treatment was also conducted under the exact same conditions as in Example 1.

Example 9

A filtration treatment was conducted using hollow yarn membrane modules identical with those used in Example 8. The number and arrangement of the membrane modules were identical with those of Example 8. The only difference from Example 8 was that no partition plates were provided in the clearances.

The gas diffuser was also formed to the same construction as that used in Example 8. Gas was diffused in the same manner as in Example 1 by using a blower under the condition that the gas diffusion intensity was set to 75 $m^3/m^2/hr$ per horizontal cross-sectional area of the membrane separator. A filtration treatment was also conducted under the exact same conditions as in Example 1.

Example 10

A filtration treatment was conducted by using hollow yarn membrane modules identical with those used in Example 1 and arranged in the same manner as those in Example 8, and changing the following conditions only. Two opposing resin plate-type enclosure wall structures were arranged parallel to the membrane modules. The enclosure wall structures had a height of 50 cm, a width of 85 cm, and a thickness of 1 cm. The gas diffuser was provided below the membrane modules and spaced from lower end portions of the membrane modules by 45 cm. The periphery of the gas diffuser was enclosed with four resin plate-type enclosure wall structures. A first set of two opposing enclosure wall structures enclosing the gas diffuser each had a height of 50 cm, a width of 85 cm, and a thickness of 1 cm. A second set of two opposing enclosure wall structures enclosing the gas diffuser each had a height of 50 cm, a width of 135 cm, and a thickness of 1 cm.

Each membrane fixing member a width (viewed from the side) of 5 cm and a length of 45 cm, so that the membrane fixing members constituted 69.8% of the total side surface area of the membrane module unit.

The gas diffuser was formed as in Example 8. Gas was diffused in the same manner as in Example 1 by using a blower under the condition that the gas diffusion intensity was set to 75 $m^3/m^2/hr$ per horizontal cross-sectional area of the membrane separator. A filtration treatment was also conducted under completely the same conditions as in Example 1.

Comparative Example A

A filtration treatment was conducted by using hollow yarn membrane modules identical with those in Example 1, and changing the following conditions only. The filtration operation was conducted without providing resin plates around the membrane modules and diffuser.

The gas diffuser was formed to the same construction as that in Example 1. Gas was diffused in the same manner as in Example 1 by using a blower under the condition that the gas diffusion intensity was set to 75 $m^3/m^2/hr$ per horizontal cross-sectional area of the membrane apparatus. The filtration treatment was also conducted under the same exact conditions as in Example 1.

The differential pressure behaviors during filtration operations in Examples 1–10 and Comparative Example A are shown in Table 1. In all of these Examples, the differential pressures determined during the filtration operations after the lapse of one year are not higher than +30 kPa as compared with those determined immediately after the starting of the filtration operations, and stay within a practically safe range.

TABLE 1

|  | Initial differential pressure (kPa) | Differential pressure after the lapse of one year (kpa) |
| --- | --- | --- |
| Example 1 | 5 | 35 |
| Example 2 | 5 | 30 |
| Example 3 | 5 | 28 |
| Example 4 | 5 | 19 |
| Example 5 | 5 | 21 |
| Example 6 | 5 | 23 |
| Example 7 | 5 | 25 |
| Example 8 | 5 | 17 |
| Example 9 | 5 | 19 |
| Example 10 | 5 | 15 |
| Comparative Example A | 5 | 77 |

In Comparative Example A, the differential pressure determined after the lapse of one year was not lower than +70 kPa, which exceeded a practical range. By contrast, the differential pressure after one year for each of the Examples was less than one half that of Comparative Example A, and in some cases less than one quarter that of Comparative Example A.

Example 11

One hollow yarn membrane module used in the one-year filtration operation in Example 1 was subjected to cleaning by immersing the same in an aqueous solution of 1% sodium percarbonate at room temperature for 6 hours. The filtration flow rates at an inter-membrane differential pressure of 0.1 MPa per membrane area of 1 $cm^2$ of the membrane module were measured for the membrane module in prior to cleaning and after cleaning. The filtration flow rates under the same conditions were also measured for a brand new module. The results were as follows:

Module uncleaned: 1.3 $ml/min \cdot cm^2$

Module cleaned: 3.9 $ml/min \cdot cm^2$

Brand-new module: 4.4 $ml/min \cdot cm^2$

Due to the cleaning operation, the filtration flow rate. of up to as high as 89% of that of a brand-new membrane module could be regained with the detergent of this invention.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A gas diffuser comprising main pipes and branch pipes, said branch pipes extending between said main pipes and containing gas discharge ports, wherein said branch pipes have a cross-sectional area A1 less than a cross-sectional area A2 of said main pipes wherein the gas discharge ports are sized, constructed and arranged to reduce the possibility or likelihood of, or prevent, sludge from blocking the ports or entering the branch pipes.

2. The gas diffuser of claim 1, wherein said gas discharge ports are positioned at bottom facing portions of said branch pipes.

3. The gas diffuser of claim 1, said gas diffuser further comprising a plurality of conduit members each inserted through an associated one of said branch pipes with a respective one of said gas discharge ports, said conduit members each having one or more openings positioned outside of an associated one of said branch pipes and one or more openings positioned inside of said associated one of said branch pipes, and wherein, for each of said conduits members, said openings positioned outside of said associated one of said branch pipes h ave a collective cross-sectional area $A_{out}$ that is less than a collective cross-sectional area $A_{in}$ of said openings positioned inside of said ass ociated one of said branch pipes.

* * * * *